United States Patent
Wisely Babu et al.

(10) Patent No.: US 10,636,190 B2
(45) Date of Patent: Apr. 28, 2020

(54) METHODS AND SYSTEMS FOR EXPLOITING PER-PIXEL MOTION CONFLICTS TO EXTRACT PRIMARY AND SECONDARY MOTIONS IN AUGMENTED REALITY SYSTEMS

(71) Applicant: Robert Bosch GmbH, Stuttgart (DE)

(72) Inventors: Benzun Pious Wisely Babu, San Jose, CA (US); Zhixin Yan, Sunnyvale, CA (US); Mao Ye, San Jose, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 27 days.

(21) Appl. No.: 16/158,878

(22) Filed: Oct. 12, 2018

(65) Prior Publication Data

US 2019/0371024 A1    Dec. 5, 2019

Related U.S. Application Data

(60) Provisional application No. 62/678,383, filed on May 31, 2018.

(51) Int. Cl.
| | | |
|---|---|---|
| G06T 11/60 | (2006.01) | |
| G06K 9/66 | (2006.01) | |
| G06T 7/246 | (2017.01) | |

(52) U.S. Cl.
CPC ............. *G06T 11/60* (2013.01); *G06K 9/66* (2013.01); *G06T 7/248* (2017.01); *G06T 2207/20076* (2013.01); *G06T 2207/20084* (2013.01)

(58) Field of Classification Search
None
See application file for complete search history.

(56) References Cited

U.S. PATENT DOCUMENTS

| | | |
|---|---|---|
| 8,988,464 B2 | 3/2015 | Kim et al. |
| 9,243,916 B2 | 1/2016 | Roumeliotis et al. |

(Continued)

OTHER PUBLICATIONS

Pablo F. Alcantarilla et al., Street-View Change Detection with Deconvolutional Networks, Proceedings of Robotics: Science and Systems, Jun. 2016. (10 pages).

(Continued)

*Primary Examiner* — Xiao M Wu
*Assistant Examiner* — Steven Z Elbinger
(74) *Attorney, Agent, or Firm* — Maginot, Moore & Beck LLP

(57) ABSTRACT

A method for motion estimation in an augmented reality (AR) system includes receiving inertial sensor data and image data during movement of the AR system generating a probability map based on the inertial sensor data and the image data, the probability map corresponding to one frame in the image data and including probability values indicating that each pixel in the one frame is in an inertial coordinate frame or a local coordinate frame with a convolutional neural network encoder/decoder, identifying visual observations of at least one landmark in the local coordinate frame based on the image data and the probability map, and generating an estimate of secondary motion in the local coordinate frame based on a first prior state in a hidden Markov model (HMM) corresponding to the local coordinate frame and the visual observations of the at least one landmark in the local coordinate frame.

18 Claims, 9 Drawing Sheets

(56) References Cited

U.S. PATENT DOCUMENTS

| | | | |
|---|---|---|---|
| 9,965,689 | B2 | 5/2018 | dos Santos Mendonca et al. |
| 2007/0253599 | A1* | 11/2007 | White .............. G01R 33/56509 382/107 |
| 2014/0218493 | A1 | 8/2014 | Dialameh et al. |
| 2014/0341465 | A1 | 11/2014 | Li et al. |
| 2015/0201180 | A1 | 7/2015 | Mourikis et al. |
| 2017/0124693 | A1 | 5/2017 | Ramalingam et al. |
| 2017/0219717 | A1 | 8/2017 | Nallampatti Ekambaram et al. |
| 2018/0053056 | A1* | 2/2018 | Rabinovich ........... G06F 3/0338 |
| 2018/0074519 | A1 | 3/2018 | Qin et al. |

OTHER PUBLICATIONS

Vijay Badrinarayanan et al., SegNet: A Deep Convolutional Encoder-Decoder Architecture for Image Segmentation, IEEE Transactions on Pattern Analysis and Machine Intelligence, vol. 39, No. 12, Dec. 2017, pp. 2481-2495. (15 pages).

Hugh Durrant-Whyte and Tim Bailey, Simultaneous Localization and Mapping: Part I, IEEE Robotics & Automation Magazine, vol. 13, No. 2, 2006, pp. 99-108. (10 pages).

Tim Bailey and Hugh Durrant-Whyte, Simultaneous Localization and Mapping (SLAM): Part II, IEEE Robotics & Automation Magazine, vol. 13, No. 3, 2006, pp. 108-117. (10 pages).

Charles Bibby and Ian Reid, Simultaneous Localisation and Mapping in Dynamic Environments (SLAMIDE) with Reversible Data Association, In Proceedings of Robotics: Science and Systems, Atlanta, GA, USA, Jun. 2007. (8 pages).

Joydeep Biswas and Manuela M. Veloso, Episodic Non-Markov Localization: Reasoning About Short-Term and Long-Term Features. Proceedings of the IEEE International Conference on Robotics and Automation (ICRA), May 2014, pp. 3969-3974. (8 pages).

J.E. Bresenham, Algorithm for computer control of a digital plotter, IBM Systems Journal, vol. 4, No. 1, 1965, pp. 25-30. (6 pages).

Cadena et al., Past, Present, and Future of Simultaneous Localization and Mapping: Toward the Robust-Perception Age, IEEE Transactions on Robotics, vol. 32, No. 6, 2016, pp. 1309-1332. (24 pages).

J. Dai et al., Instance-aware Semantic Segmentation via Multi-task Network Cascades, Proceedings of the IEEE Conference on Computer Vision and Pattern Recognition, pp. 3150-3158, 2016. (10 pages).

C. Forster et al, On-Manifold Preintegration for Real-Time Visual-Inertial Odometry, IEEE Transactions on Robotics, 2016. (21 pages).

C. Jiang et al, Static-map and Dynamic Object Reconstruction in Outdoor Scenes using 3D Motion Segmentation, IEEE Robotics and Automation Letters, vol. 1, No. 1, pp. 324-331, Jan. 2016, doi: 10.1109/LRA.2016.2517207 (9 pages).

E. S. Jones and Stefano Soatto, Visual-inertial navigation, mapping and localization: A scalable real-time causal approach, The International Journal of Robotics Research, vol. 30, No. 4, pp. 407-430, 2011. (24 pages).

Alex Kendall and Roberto Cipolla, Geometric loss functions for camera pose regression with deep learning, The IEEE Conference on Computer Vision and Pattern Recognition (CVPR), pp. 5974-5983, 2017. (11 pages).

A. Kendall et al., PoseNet: A Convolutional Network for Real-Time 6-DOF Camera Relocalization, The IEEE International Conference on Computer Vision (ICCV), pp. 2938-2946, 2015. (10 pages).

A. Kendall et al., End-toEnd Learning of Geometry and Context for Deep Stereo Regression, The IEEE International Conference on Computer Vision (ICCV), pp. 66-75, 2017. (11 pages).

L. Kneip et al., A Novel Parametrization of the Perspective-Three-Point Problem for a Direct Computation of Absolute Camera Position and Orientation, Proceedings of the IEEE Conference on Computer Vision and Pattern Recognition (CVPR), pp. 2969-2976, Jun. 2011. (9 pages).

S. Leutenegger et al., BRISK: Binary Robust Invariant Scalable Keypoints, Proceedings of the International Conference on Computer Vision (ICCV), pp. 2548-2555, Nov. 2011. (9 pages).

J Long et al., Fully Convolutional Networks for Semantic Segmentation, Proceedings of the IEEE Conference on Computer Vision and Pattern Recognition, pp. 3431-3440, 2015. (10 pages).

W. Luo et al., Efficient Deep Learning for Stereo Matching, Proceedings of the IEEE Conference on Computer Vision and Pattern Recognition, pp. 5695-5703, Las Vegas, Jun. 2016. (10 pages).

A. Mourikis and S. Roumeliotis, A Multi-State Constraint Kalman Filter for Vision-aided Inertial Navigation, IEEE International Conference on Robotics and Automation, pp. 3565-3572, Apr. 2007. (8 pages).

R. Mur-Artal and J. D. Tardos, Visual-Inertial Monocular SLAM with Map Reuse, IEEE Robotics and Automation Letters, vol. 2, Issue 2, pp. 796-803, Apr. 2017. (10 pages).

J. Neira and J. D. Tardos, Data Association in Stochastic Mapping Using the Joint Compatibility Test, IEEE Transactions on Robotics and Automation, vol. 17, No. 6, pp. 890-897,Dec. 2001. (8 pages).

N. D. Reddy et al., Incremental Real-Time Multibody VSLAM with Trajectory Optimization Using Stereo Camera, IEEE International Conference on Intelligent Robots and Systems (IROS), Daejeon, Korea, Oct. 2016. (6 pages).

E. Rosten and T. Drummond, Machine learning for high-speed corner detection. (14 pages).

J. Zbontar and Y. LeCUN, Stereo Matching by Training a Convolutional Neural Network to Compare Image Patches, Journal of Machine Learning Research, vol. 17 (1-32) 2016. (32 pages).

M. D. Zeiler, ADADELTA: An Adaptive Learning Rate Method, arXiv preprint arXiv:1212.5701, 2012. (6 pages).

Y. Zhong et al., Self-Supervised Learning for Stereo Matching with Self-Improving Ability, arXiv preprint arXiv:1709.00930, 2017. (13 pages).

T. Zhou et al., Unsupervised Learning of Depth and Ego-Motion from Video, IEEE Conference on Computer Vision and Pattern Recognition (CVPR), pp. 1851-1858, 2017 (12 pages).

R. Benosman et al, Asynchronous Event-Based Hebbian Epipolar Geometry, IEEE Transactions on Neural Networks, vol. 22, No. 11, pp. 1723-1734, Nov. 2011. (12 pages).

E. Karami, S. Prasad, and M. Shehata , Image Matching Using SIFT, SURF, BRIEF and ORB: Performance Comparison for Distorted Images. (5 pages).

M. Narayana et al., Coherent Motion Segmentation in Moving Camera Videos Using Optical Flow Orientations, The IEEE International Conference on Computer Vision (ICCV), pp. 1577-1584, 2013. (8 pages).

J. Shi and J. Malik, Motion Segmentation and Tracking Using Normalized Cuts, International Conference on computer Vision, pp. 1154-1160, Jan. 1998. (7 pages).

R. Vidal and Y. Ma, A Unified Algebraic Approach to 2-D and 3-D Motion Segmentation, In T. Pajdla and J. Matas, eds., Computer Vision—ECCV 2004, pp. 1-15. (15 pages).

J. Civera et al., 1-Point RANSAC for Extended Kalman Filtering: Application to Real-Time Structure from Motion and Visual Odometry, Journal of Field Robotics, vol. 27, No. 5, pp. 609-631, 2010. (23 pages).

T Lupton and S Sukkarieh, Visual-Inertial-Aided Navigation for High-Dynamic Motion in Built Environments Without Initial Conditions, IEEE Transactions on Robotics, vol. 28, No. 1, pp. 61-76, Feb. 2012. (16 pages).

Leutenegger, S. et al., "Keyframe-Based Visual-Inertial Odometry Using Nonlinear Optimization," The International Journal of Robotics Research, 2015 (26 pages).

Roussos, A. et al., "Dense Multibody Motion Estimation and Reconstruction from a Handheld Camera," IEEE International Symposium on Mixed and Augmented Reality, 2012 (10 pages).

Hartley, R. I. et al., "Epipolar Geometry and the Fundamental Matrix," Multiple View Geometry in Computer Vision, Cambridge University Press, Second Edition, 2004 (23 pages).

Chollet, F. et al., "Keras: Deep Learning for Humans," https://github.com/keras-team/keras, 2015, (5 pages).

Klein, Georg and Murray, David, Parallel Tracking and Mapping for Small AR Workspaces, IEEE and ACM International Symposium on Mixed and Augmented Reality, pp. 225-234, Nara, Japan, Nov. 2007.

(56) References Cited

OTHER PUBLICATIONS

Garon, Mathieu and Lalonde, Jean-Francois, Deep 6-DOF Tracking, IEEE Transactions on Visualization and Computer Graphics, vol. 23, No. 11, Nov. 2017.

Barnes, Dan, Maddern, Will, Pascoe, Geoffrey, and Posner, Ingmar, Driven to Distraction: Self-Supervised Distractor Learning for Robust Monocular Visual Odometry in Urban Environments, IEEE International Conference on Robotics and Automation (ICRA), pp. 1894-1900, May 21-25, 2018, Brisbane, Australia.

Rosten, E. and Drummond, T.; Fusing Points and Lines for High Performance Tracking, Proceedings of the International Conference on Computer Vision (ICCV), vol. 2, pp. 1508-1515, Oct. 2005, doi: 10.1109/ICCV.2005.104.

Babu, B. P. Wisely, Cyganski, D., Duckworth, J., and Kim, S., Detection and Resolution of Motion Conflict in Visual Inertial Odometry, Proceedings of the IEEE International Conference on Robotics and Automation (ICRA), pp. 996-1002, Brisbane, May 21-25, 2018.

Strasdat, H., Davison, A. J., Montiel, J.M.M, and Konolige, K., Double Window Optimisation for Constant Time Visual SLAM, International Conference on Computer Vision, pp. 2352-2359, Nov. 2011.

Sabzevari, R. and Scaramuzza, D., Multi-body Motion Estimation from Monocular Vehicle-Mounted Cameras, IEEE Transaction on Robotics, vol. 32, No. 3, pp. 638-651, Jun. 2016, doi: 10.1109/TRO.2016.2552548.

Tan, W., Liu, H., Dong, Z., Zhang, G., and Bao, H., Robust Monocular SLAM in Dynamic Environments, IEEE International Symposium on Mixed and Augmented Reality (ISMAR), pp. 209-218, Oct. 1-4, 2013, Adelaide, Australia, doi:10.1109/ISMAR.2013.6671781.

Wang, S., Clark, R., Wen, H., and Trigoni, N., DeepVO: Towards End-to-End Visual Odometry with Deep Recurrent Convolutional Neural Networks, IEEE International Conference on Robotics and Automation (ICRA), Singapore, May 29-Jun. 3, 2017, pp. 2043-2050.

Wang, C., and Thorpe, C., Simultaneous Localization and Mapping with Detection and Tracking of Moving Objects, IEEE International Conference on Robotics & Automation, Washington D.C., May 2002, pp. 2918-2924.

* cited by examiner

METHODS AND SYSTEMS FOR EXPLOITING PER-PIXEL MOTION CONFLICTS TO EXTRACT PRIMARY AND SECONDARY MOTIONS IN AUGMENTED REALITY SYSTEMS

CLAIM OF PRIORITY

This application claims the benefit of U.S. Provisional Application No. 62/678,383, which is entitled "On Exploiting Per-Pixel Motion Conflicts to Extract Secondary Motions," and was filed on May 31, 2018, the entire contents of which are hereby incorporated herein by reference.

FIELD

This disclosure relates generally to the field of augmented reality systems for human computer interaction and, more specifically, to systems and methods for detecting primary and secondary motion in augmented reality systems.

BACKGROUND

Unless otherwise indicated herein, the materials described in this section are not prior art to the claims in this application and are not admitted to the prior art by inclusion in this section.

Augmented reality (AR) systems use computerized devices to provide a human machine interface that enables a human to view a real-world physical environment while providing a display of virtual graphics that "augment" features of the physical environment. A common type of AR device includes transparent glasses with one or more sensors and a video projection device that a human operator wears. The transparent glasses enable the human to view the real-world physical environment and the AR device projects graphical data onto the glasses or directly onto the eyes of the user at locations corresponding to objects, locations, or other features in the physical environment. In some instances, the graphics display information or otherwise add graphical elements to "augment" a physical object in the physical environment while in other instances the graphics provide a two-dimensional or three-dimensional rendition of information or a virtual object that does not actually exist in the physical environment. While augmented reality systems share some features with "virtual reality" (VR) systems, one distinction between AR and VR systems is that AR systems provide a visual depiction and graphical interaction with a real-world physical environment that is not generated by a computer and is not under the control of a computer, while VR systems produce graphical displays of completely computer-generated environments. As such, many operations in AR systems require additional processing to enable the AR system to measure parameters of the physical environment around the AR system to provide accurate augmented graphics.

One function of an AR system performs "localization" to identify the locations of sensors in the AR system in relation to the environment around the system. In particular, many AR systems use both a camera system and inertial sensors, such as MEMs accelerometers and gyroscopes, to perform the localization. The prior-art systems combine the outputs of the camera and the inertial sensor together to perform localization. Since the sensors are generally integrated into a device that is worn by a user, localization of the sensor locations also provides localization of the user in the environment. Most prior-art AR systems assume a static environment and handle only the primary motion consistent with the inertial coordinate frame, which is to say these systems can perform localization in a static, non-moving environment ("inertial coordinate frame") and then use the input of the AR sensors to identify the motion of the AR system and the user with respect to the static inertial coordinate frame ("primary motion"). A simple example of this is to measure the movement of a user who wears an AR system in a stationary room that provides the inertial coordinate frame.

Existing AR systems are substantially less effective in handling dynamic environments in which there are multiple types of motion and multiple coordinate frames that produce inconsistent or "conflicting" sensor data inputs. To cite a common, non-limiting example, when a user wears an AR device in a moving motor vehicle the true inertial reference coordinate frame, such as the non-moving road, appears to be moving in the visual input from the camera system sensors while the inertial sensors in the AR device might register no movement whatsoever if the wearer of the device sits still and does not move relative to the interior of the vehicle while the vehicle travels at a constant velocity (which produces no acceleration). The interior of the vehicle is said to be a "local coordinate frame" because the local movement of the user and the AR system is relative to the interior of the vehicle even if the entire vehicle and the AR system are also moving relative to the inertial coordinate frame of the road. Furthermore, any movement of the user and AR system within the vehicle produces inertial motion data that do not match the perceived movement from the camera system because of course the movement of the vehicle relative to the inertial coordinate frame of the road is substantially different than the movement of a user relative to the local coordinate frame of the vehicle. Even the input data from the camera system is typically inconsistent because a portion of each generated image of video data includes the local coordinate frame of the interior of the vehicle, which is static relative to the user unless the user moves, while another portion of the image includes the inertial coordinate frame of the exterior environment that appears to be moving relative to the local coordinate frame of the vehicle.

The aforementioned problems in existing AR systems reduce the accuracy of measurements of both the primary motion of the AR sensors in the AR system and provide further challenges in accurately tracking "secondary motions", which refer to movements of the sensors in the AR system relative to a local coordinate frame. Using the moving vehicle example above, secondary motions occur in the local coordinate frame of the interior of the vehicle, such as the movement of the AR system itself, or of another object within the interior of the vehicle. Accurate tracking of the secondary motion requires accurate tracking of the primary motion, which is difficult in a local coordinate frame due to the sensor conflicts that are described above. For example, there are techniques that are known to the art for motion tracking of moving objects in video data in an inertial coordinate frame, but if the camera is moving in an unknown manner due to inaccurate primary motion tracking arising from conflicting sensor data, then accurate movement tracking of the camera relative to an external object in a local coordinate frame with the video data becomes substantially more difficult or impractical. Additionally, while some techniques are known to the art to improve the accuracy of primary motion tracking in situations that include multiple coordinate frames, these techniques rely on identifying and rejecting potentially conflicting sensor data that improves the accuracy of primary motion detection based on the inertial coordinate frame but prevents accurate secondary motion detection for the local coordinate frame. Furthermore, while of course systems and methods exist for tracking relative movement using active sensors such as RADAR and LIDAR, these active sensors are impractical for use in many AR systems.

As described above, prior-art AR systems encounter difficulties in performing localization and tracking primary and secondary movement in situations where video and inertial sensor data experience conflicts due to the relative motion produced by both an inertial coordinate and a local coordinate frame in the sensor data. Consequently, improvements to AR systems and methods of operation thereof to improve the accuracy of both primary and secondary movement detection would be beneficial.

SUMMARY

The embodiments described herein provide systems and methods for motion estimation in AR systems that provide Motion Conflict aware Visual Inertial Odometry (MC-VIO) that enable an AR system to perform localization for both an inertial coordinate frame and a local coordinate frame to provide improved primary motion detection and secondary motion detection.

In one embodiment, a method for motion estimation in an augmented reality (AR) system has been developed. The method includes receiving, with an inertial sensor system, inertial sensor data during movement of the AR system; receiving, with a camera system, a plurality of frames of image data during the movement of the AR system; generating, with a processor implementing a convolutional neural network encoder/decoder, a probability map based on the inertial sensor data and the plurality of frames of image data, the probability map corresponding to one frame in the plurality of frames of image data and including a plurality of probability values corresponding to a plurality of pixels in the one frame, each probability value in the plurality of probability values indicating a probability that the corresponding pixel is in an inertial coordinate frame or a local coordinate frame; identifying, with the processor, visual observations of at least one landmark in the local coordinate frame based on the plurality of frames of image data and the probability map; and generating, with the processor, an estimate of secondary motion for the AR system with reference to the local coordinate frame based on a first prior state in a hidden Markov model (HMM) corresponding to the local coordinate frame and the visual observations of the at least one landmark in the local coordinate frame.

In another embodiment, an augmented reality (AR) system has been developed. The AR system includes an inertial sensor system, a camera system, a display device, and a processor operatively connected to the inertial sensor system, the camera system, and the display device. The processor is configured to receive inertial sensor data generated by the inertial sensor system during movement of the AR system; receive a plurality of frames of image data generated by the camera system during the movement of the AR system; generate a probability map based on the inertial sensor data and the plurality of frames of image data using a convolutional neural network encoder/decoder, the probability map corresponding to one frame in the plurality of frames of image data and including a plurality of probability values corresponding to a plurality of pixels in the one frame, each probability value in the plurality of probability values indicating a probability that the corresponding pixel is in an inertial coordinate frame or a local coordinate frame; identify visual observations of at least one landmark in the local coordinate frame based on the plurality of frames of image data and the probability map; and generate an estimate of secondary motion for the AR system with reference to the local coordinate frame based on a first prior state in a hidden Markov model (HMM) corresponding to the local coordinate frame and the visual observations of the at least one landmark in the local coordinate frame.

DETAILED DESCRIPTION

Figure 1:
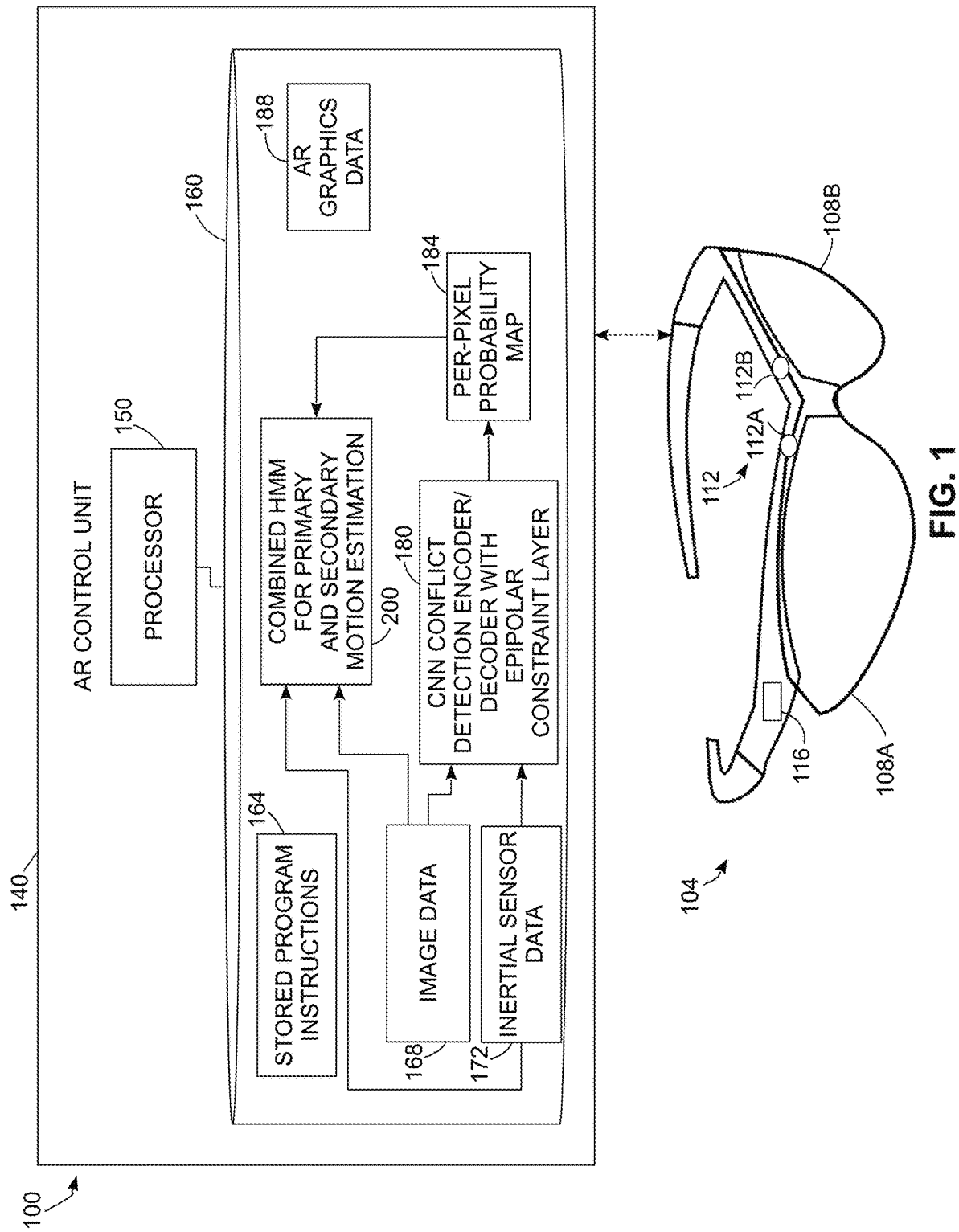
FIG. 1 is schematic diagram of an augmented reality (AR) system that is configured to estimate primary and secondary motion.

For the purposes of promoting an understanding of the principles of the embodiments disclosed herein, reference is now be made to the drawings and descriptions in the following written specification. No limitation to the scope of the subject matter is intended by the references. This disclosure also includes any alterations and modifications to the illustrated embodiments and includes further applications of the principles of the disclosed embodiments as would normally occur to one skilled in the art to which this disclosure pertains.

As used herein, the term "primary motion" refers to motion of an augmented reality (AR) device that incorporates a camera system and an inertial sensor system with respect to an inertial coordinate frame. In the context of an AR device, the inertial coordinate frame is a fixed coordinate system that is assumed to be static (non-moving) while the AR device itself and potentially other objects move relative to the inertial coordinate frame. Non-limiting practical examples of inertial coordinate frames that are described in examples below include the surface of the earth, fixed objects that do not move relative to the surface of the earth, walls, floors, ceilings and other static structures in buildings, and the like.

A used herein, the term "secondary motion" refers to motion of the AR device that incorporates a camera system and an inertial sensor system with respect to an inertial coordinate frame. A non-limiting example of a local coordinate frame can include the movement of the AR system relative to an interior of a vehicle or to an object held in the hand of the user of the AR system such as a book, clip board, notebook computer, and the like. While the AR system uses both the video data from a camera system and the inertial data from inertial sensors for tracking primary motion, the AR system only uses video data from the camera system for tracking secondary motion since the nature of the accelerometers and gyroscopes in inertial sensors is tied to the inertial coordinate frame.

As used herein, the term "conflict" refers to a situation in which input data from two different sensors in an augmented reality system provide non-consistent ("conflicting") data regarding either or both of the primary motion and secondary motion. For example, a camera system may generate pixel data that indicate primary motion in one direction while an inertial sensor indicates primary motion in another direction, which produces a conflict. The embodiments described herein detect conflicts in image data from a camera system on a per-pixel basis and use the conflict information to improve the accuracy of both primary and secondary motion detection.

As used herein, the term "landmark" refers to an object that an AR system detects in image sensor data that does not move over time relative to a coordinate frame, which can be either an inertial coordinate frame or a local coordinate frame. Examples of landmarks in an inertial coordinate frame include a tree, light pole, sign post, or any other static object that does not move relative to the ground in the inertial coordinate frame. Examples of landmarks in a local coordinate frame include fixed elements of a dashboard and other fixed features of the interior of a vehicle in a situation where the interior of the vehicle forms the local coordinate frame.

A landmark is identified based on one or more visual observations that are generated based on a feature extraction process that is applied to a series of image frames that a camera system in the AR system generates during operation. In the embodiments described herein, visual observations are generated using the Features from Accelerated Segment Test (FAST) algorithm or another feature extraction algorithm. While not described in great detail herein, the FAST algorithm detects features that correspond to the corners of objects in image data by generating a circle of pixels around a candidate pixel for a corner and identifying that a candidate actually is a corner based on the pixel intensity level of both the candidate pixel and the pixels that surround the candidate. Machine learning techniques including decision trees, neural networks and other image processing techniques may be employed to perform variants of the FAST algorithm in an efficient manner. The embodiments described herein combine FAST with another technique known as Binary Robust Invariant Scalable Keypoints (BRISK), which performs key point detection based on the features from FAST to generate the visual observations z as keypoint descriptors. While the visual observations z are generated over a series of frames of image data, each visual observation z maps to a group of pixels in each frame, and as described in further detail below a deep neural network classifier generates a classification for each pixel as corresponding to the inertial coordinate frame or the local coordinate frame.

In a practical AR system, the landmarks are not known a priori and must be estimated from the image sensor input data concurrently to the processes that estimate the primary and secondary motion of the AR system as part of a process that is referred to as simultaneous localization and mapping (SLAM). In SLAM, the estimation of the primary and secondary motions is related to the localization process while the estimation of the landmarks is related to the mapping process. As described in further detail below, the AR systems and methods described herein generate visual observations of landmarks where the visual observations are generated based on multiple frames of video taken over time as the AR system moves relative to the inertial and local coordinate frames. Since the landmarks do not move, any change of position of a landmark over time in the visual observations actually corresponds to movement of the AR system, and the AR uses visual observations of landmarks to correct the estimates of motion that are generated using a Hidden Markov Model and the inertial sensor inputs. The AR system embodiments further classify the individual pixels in frames of image data as belonging to the inertial or local coordinate frame. The AR system then identifies landmarks in visual observations of multiple images, and classifies if the landmarks belong to the inertial coordinate frame or the local coordinate frame based on the classifications of pixels from each image. This classification process enables the estimation of secondary motion and improves the accuracy of the estimation of primary motion.

FIG. 1 is a schematic diagram of an AR system 100. The AR system 100 includes a set of AR glasses 104 that are configured to be worn on the head of a user and an AR control unit 140 that is either fully integrated into the AR glasses 104 or is embodied as one or more computing devices that are operatively connected to the components in the AR glasses 104.

The AR glasses 104 include lenses 108A and 108B, a camera system 112, which in the embodiment of FIG. 1 includes stereoscopic cameras 112A and 112B, and one or more inertial sensors 116. The lenses 108A and 108B are transparent and enable a user to see the surrounding physical environment in a similar manner to an ordinary set of glasses or sunglasses. The lenses 108A and 108B also provide either a transparent display that generate graphics in an AR system to augment features in the physical environment without obscuring the view of the physical environment or provide surfaces for the projection of graphics from an integrated projection device in the AR glasses 104. In still another embodiment, the AR glasses 104 include a projection device that can emit graphics directly into the eyes of the user, and these embodiments optionally omit the lenses 108A and 108B. The camera system 112 generates stereoscopic frames of image data in video data to record the physical environment around the AR glasses 104. The camera system 112 includes two cameras 112A and 112B that both produce frames of image data in a video data stream with a physical separation between the two cameras 112A and 112B that provides stereoscopic frames of image data. While the camera system 112 provides stereoscopic image data, the primary and secondary motion estimation processes described herein can also be performed using monoscopic image data that are generated using a single camera. The inertial sensors 116 include, for example, a multi-axis accelerometer or multiple single axis accelerometers that measure linear acceleration in three dimensions, one or more gyroscopes that measure rotational acceleration, to provide inertial sensor data to track the linear and angular accelerations that the AR glasses 104 experience during operation. In some embodiments, the inertial sensors 116 are embodied as an inertial measurement unit (IMU) that uses microelectromechincal systems (MEMs) devices to implement the accelerometers and gyroscopes.

The AR control unit 140 includes a processor 150 that is connected to a memory 160. The processor 150 in the AR control unit 150 is operatively connected to input devices that provide user input to the AR system 100, graphical output display devices such as projectors or displays that use the lenses 108A and 108B or that project graphics directly into the eyes of a user, the camera system 112 and the inertial sensors 116.

The processor 150 is a digital logic device that incorporates, for example, one or more of a microprocessor, microcontroller, field programmable gate array (FPGA), digital signal processor (DSP), application specific integrated circuit (ASIC), and the like. In one illustrative embodiment, the processor 150 is implemented as a system on a chip (SoC) that includes a central processing unit (CPU) with one or more cores, and a graphical processing unit (GPU) that implements hardware to accelerate the generation of graphics for display to the user. In some embodiments, the CPU, the GPU, or a separate digital logic device in the processor 150 also implements hardware acceleration of inferencing using a deep convolutional neural network encoder/decoder, which the AR system 100 uses to resolve conflicts in pixels of image data frames generated by the camera system 112 in situations in which the AR system 100 is in an environment that includes both an inertial coordinate frame and a local coordinate frame.

The memory 160 includes one or more non-volatile memory devices such as a solid state or magnetic storage device, and one or more volatile memory devices such as random access memory (RAM) to store data in the AR system 100. In FIG. 1, the memory 160 stores program instructions 164 that the processor 150 executes to perform the operations described herein. The memory 160 stores image data 168, which includes multiple frames of image data in a video stream that the camera system 112 generates during operation of the AR system 100. The memory 160 stores inertial sensor data 172, which the inertial sensors 116 generate during operation of the AR system 100. The memory 160 stores the image data 168 and the inertial sensor data 172 with timestamps to enable the AR system 100 to synchronize frames of image data from the camera system 112 with the inertial sensor data 172 that occur simultaneously during operation of the AR system 100. The memory 160 also stores a deep convolutional neural network (CNN) encoder/decoder 180 that uses an epipolar constrained layer to generate a per-pixel probability map 184 that identifies the probability of each pixel in a frame of image data 168 corresponding to either the inertial coordinate frame or the local coordinate frame in situations where the AR system receives conflicting sensor data. The memory 160 also stores a Hidden Markov Model (HMM) 200 that the AR system 100 uses for both primary motion estimation and secondary motion estimation using a state model based on a previously estimated state for the primary and secondary motion as well as present time inputs from the image data 168, the inertial sensor data 172, and the output of the per-pixel probability map 184. The memory 160 also stores AR graphics data 188. The AR graphics data 188 include, for example, two-dimensional images, three-dimensional geometric models and textures for the three-dimensional geometric models, shader programs for execution by shader hardware in a GPU of the processor 150, and any other data that the AR system 100 uses to generate graphics to provide an augmented reality output to the user. As described in further detail below, the improvements to the primary motion estimation and secondary motion estimation in the AR system 100 enable the processor 150 to generate graphics with accurate placement in both the inertial coordinate frame and the local coordinate frame using the AR graphics data 188.

While FIG. 1 depicts a single AR control unit 140 for illustrative purposes, alternative embodiments can include multiple computing devices that implement the functions of the AR system 100 using both a local computing device that is carried by the user and one or more remote computing devices that communicate with the local computing device via a wired or wireless data network. For example, in some embodiments an AR system uses remote server computing devices to perform some of the functions described herein while a smaller local processing device that is integrated with the AR glasses 104 or is carried separately by the user performs other functions that are described herein. As such, any references to the AR control unit 140 and the operation of the processor 150 and memory 160 should be understood to apply to both a single computing device or to a combination of multiple computing devices that are configured to operate together to implement the embodiments described herein.

Figure 2:
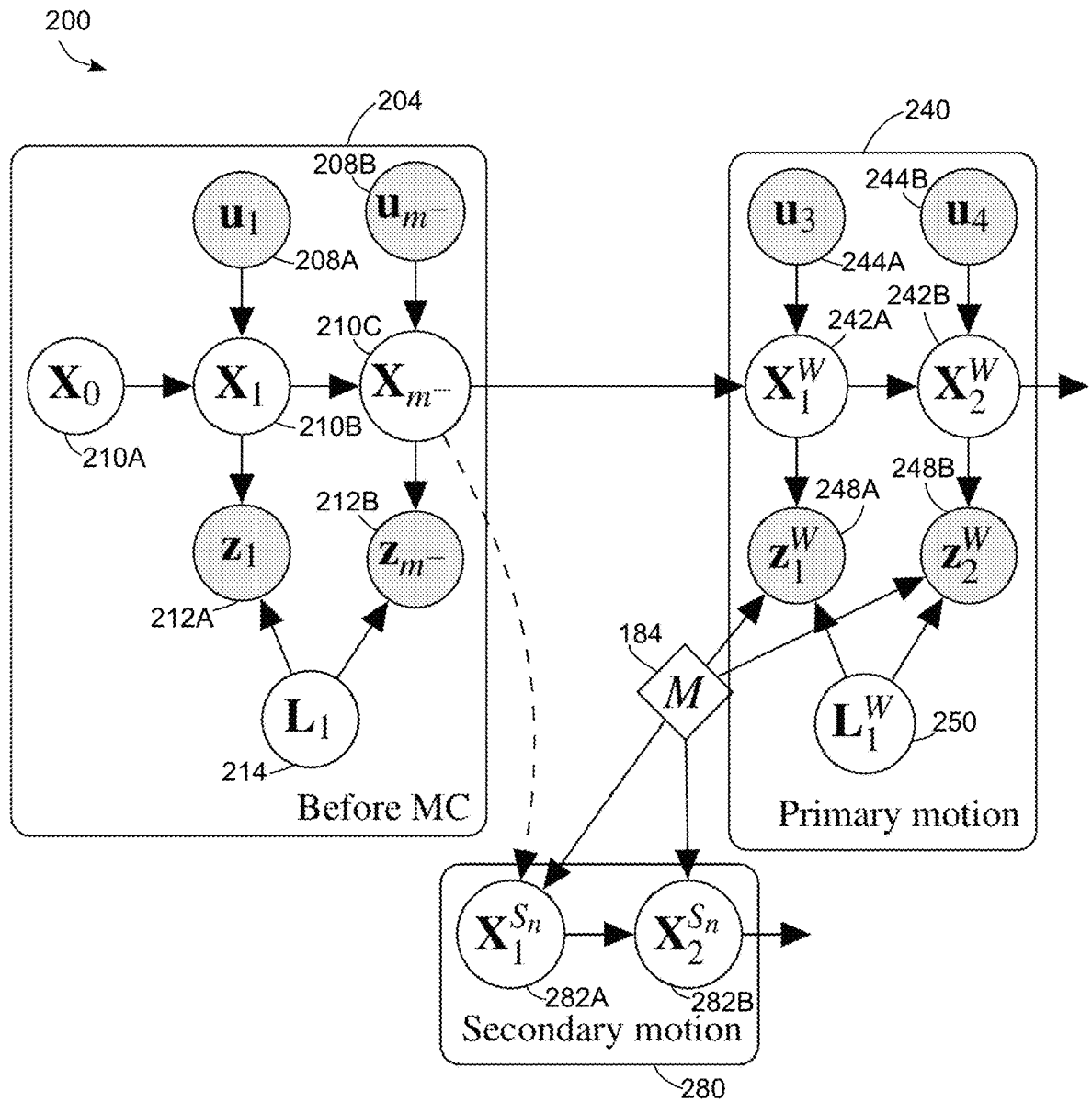
FIG. 2 is a diagram of a Hidden Markov Model (HMM) that the AR system of FIG. 1 uses to track primary and secondary motion.

FIG. 2 is a diagram of the Hidden Markov Model (HMM) 200 that the AR system 100 uses for estimation of both the primary motion and the secondary motion trajectories. FIG. 2 depicts the HMM 200 including a single group of states and inputs 204 that occurs when the AR system 100 does not experience a motion conflict in group 204, and two separate groups of states and inputs 240 and 280 that perform estimation of the primary motion (group 240) and estimation of the secondary motion (group 280) when the system experiences a conflict in sensor data due to the presence of both an inertial coordinate frame and a local coordinate frame in the frames of image data from the camera system. In more detail, the group 204 includes multiple states that estimate the trajectory in a single, inertial coordinate frame starting from an initial state 210A ($X_0$) and including additional states 210B ($X_1$) and 210C ($X_{m-}$), where the state 210C ($X_{m-}$) represents the final state estimate that is generated prior to the introduction of a local coordinate frame and estimation of both primary and secondary motion. In the group 204 of FIG. 2, the present time inertial observations that are based on data from the inertial sensors are represented by nodes 208A ($u_1$) and 208B ($u_{m-}$). During operation, the system 100 determines the next state in the series 210B-210C based on the previous state and the present input from the inertial sensors observations shown in 208A-208B. Thus, the state 210C is predicted based on the prior state 210B (and ignoring older states that occurred prior to the state 210B) and the inertial observations 208B that form the present-time input for the state 210C. The inertial observations 208A ($u_1$) and 208B ($u_{m-}$) provide inputs to enable the HMM 200 to propagate from one state to the next state to generate updated estimates of the primary motion.

In isolation, the combination of states and the inertial observations forms a type of inertial navigation system that might provide accurate primary motion prediction in an unrealistic scenario where the inertial observations 208A and 208B always provide perfect information as to the movement of the AR system. However, in practical systems even small errors in the inertial observations 208A and 208B accumulate over time and the predicted motion values in the states produce results that are not sufficiently accurate for practical use with an AR system. Therefore, the HMM 200 also employs visual observations 212A ($z_1$) and 212B ($z_2$), which are generated based on multiple frames of video data and landmarks that are identified in the multiple frames of video data as represented by the landmark node 214 ($L_1$). Unlike the primary motion states in nodes 210A-210C, the landmark node 214 is a single node because the position of a landmark does not change over time. However, the precise set of observed landmarks may change over time due to changes in the visual observations, such as when the cameras in an AR system capture images of a sign post landmark over time followed by additional visual observations that do not include the sign post landmark when the cameras in the AR system no longer view the landmark. The final estimate of motion is based on the prediction from the HMM 200 based on the prior state and the present inertial inputs and a posterior error minimization process that uses the visual observations z of the landmarks L to generate accurate motion estimates.

The AR system 100 operates using the HMM group 204 in situations in which there is no conflict between sensor data between the inertial sensors and the camera system. However, the Markovian assumption that a state $X_k$ depends only upon the input $u_k$ and the previous state $X_{k-1}$ is not valid as soon as a motion conflict emerges. If such a conflict occurs, the AR system 100 receives user input that identifies an object that provides a local coordinate frame to enable the AR system 100 to provide estimates of both primary motion and secondary motion. As depicted in further detail in FIG. 8A and FIG. 8B, a non-limiting embodiment of an object that provides the local coordinate frame is the dashboard of the interior of a motor vehicle. The AR system 100 then uses the two groups of states in the HMM 200 to estimate primary motion (group 240) and secondary motion (group 280). The primary motion group 240 is illustrating including the states 242A ($X^W_1$) and 242B ($X^W_2$), and additional states are generated over time during the primary motion estimation process. The primary motion group 240 also includes the inertial sensor inputs 244A ($u_3$) and 244B ($u_4$), which propagate the primary motion states X over time. The visual observations 248A ($z^W_1$) and 248B ($z^W_2$) that correspond to landmarks from the landmark estimation node 250 ($L^W_1$) where the landmarks 250 include both landmarks in the inertial coordinate frame that correspond to primary motion and landmarks in the local coordinate frame that correspond to secondary motion. The visual observations 248A and 248B correspond to landmarks in the image data, which are detected in a separate process that is described below, but each landmark also maps to one or more pixels in the original image data. In particular, the embodiments described herein use a "sparse" feature detection process that identifies a comparatively small number of landmarks in the inertial and local coordinate frames, and each landmark maps back to a subset of the pixels in the original image data.

In the HMM 200, the group 280 includes states 282A ($X^{Sn}_1$) and 282B ($X^{Sn}_2$) that correspond to secondary motion. Unlike primary motion, the group 280 only updates the estimated states for secondary motion based on visual observations of landmarks that are in the local coordinate frame.

FIG. 2 also depicts a per-pixel probability map 184 (M) that is applied to the image data inputs to the states in both of the HMM groups 240 and 280. In the embodiment of FIG. 2, the visual observations 248A and 248B are generated based on landmarks in all of the image data, which can include both the inertial and local coordinate frames. To resolve conflicts in the sensor data in which the pixels of some landmarks correspond to the inertial coordinate frame while the pixels of other landmarks correspond to the local coordinate frame, the per-pixel probability map provides a weighting value for each pixel that indicates the probability that the pixel corresponds to either the inertial coordinate frame or the local coordinate frame. Since each of the visual observations 248A and 248B can be mapped to a set of pixels in each frame of image data, the per-pixel probability map 184 enables an AR system to classify the visual observations of landmarks as being in the inertial coordinate frame for primary motion estimation in the group 240 or in the local coordinate frame for secondary motion estimation in the group 280. For example, in one configuration the per-pixel probability map 184 includes a numeric value in a range of [0.0, 1.0] for each pixel, where a value of 0.0 indicates full certainty that a pixel is in the inertial coordinate frame while a value of 1.0 indicates full certainty that a pixel is in the local coordinate frame. Intermediate probability values for each pixel can also indicate different degrees of certainty for a pixel to be included in either coordinate frame (e.g. a value of 0.5 indicates equal probability that a pixel is in either coordinate frame).

The per-pixel probability weight map 184 improves the accuracy of primary and secondary motion estimation in the HMM 200 by ensuring that the HMM 200 assigns the greatest weight to pixels of the visual observations 248A and 248B with the highest probability of corresponding to the inertial coordinate frame for the primary motion estimation states 242A and 242B while using the pixels with the highest probability of corresponding to visual observations in the local coordinate frame for the second motion estimation states 282A and 282B. As described in further detail below, the AR system 100 uses a deep convolutional neural network encoder/decoder framework with an epipolar constrained layer to generate the per-pixel probability map 184.

The AR system 100 uses a Maximum a Posteriori (MAP) criterion optimization to estimate the state of the system in the HMM 200. The optimization process minimizes residuals (errors) $\hat{u}$ in estimates based on measurement that are generated by the inertial sensors 116 and the residuals $\hat{z}_k$ in estimates based on visual observations in the image data generated by the camera system 112. The per-pixel probability map 184 (M) is used with the MAP optimization process to determine the correct association of residuals to either the inertial coordinate frame (W) or the local coordinate frame ($S_n$). The MAP optimization process seeks to minimize the residual values, and the correct mapping of pixels and their corresponding visual features z to either the inertial or local coordinate frame enables the AR system 100 to reduce the residual values to a greater degree than is practical when operating under the incorrect assumption that all of the sensor data are consistent with the inertial coordinate frame. The MAP process is described mathematically below for reducing the residuals $\hat{X}^W$ in the inertial coordinate frame for primary motion estimation and $\hat{X}_k^{Sn}$ in the local coordinate frame for secondary motion estimation:

$$\hat{X}^W = \arg\max X_k^W P(X_{m-}) P(X_{k-1}^W | X_{m-}) P(X_k^W | X_{k-1}^W, u_k, z_k, M)$$

$$\hat{X}_k^{Sn} = \arg\max X_k^{Sn} P(X_{m-}) P(X_{k-1}^{Sn} | X_{m-}) P(X_k^{Sn} | X_{k-1}^{Sn}, z_k, M)$$

In the HMM 200 and the equations above, the final state $X_{m-}$ in the group 204 corresponds to the final estimated motion trajectory that is generated prior to the emergence of the motion conflict with two different coordinate frames. The final state $X_{m-}$ in the group 204 of the HMM becomes the initial state for both the primary motion estimation in group 240 and the secondary motion estimation in group 280, which diverge from each other due to the differences in the primary and secondary motion. The terms $P(X_{m-})$ $P(X_{k-1}{}^{W}|X_{m-})$ and $P(X_{m-})P(X_{k-1}{}^{S_n}|X_{m-})$ represent the transition probability from combined state estimator in group 204 to the primary motion state estimator in group 240, and the secondary motion state estimator in group 280, respectively. In an environment where the landmarks are not stationary, the visual observations cannot be associated to the appropriate state estimator solely based on the current state $X_k$ of the system. In addition to the current state, the motion associated with the landmark was also determined. The AR system 100 estimates the association using the per-pixel probability map M to classify the probability that each pixel, and the landmarks in the visual observations that correspond to pixels, are in the inertial coordinate frame or the local coordinate frame.

Figure 3:
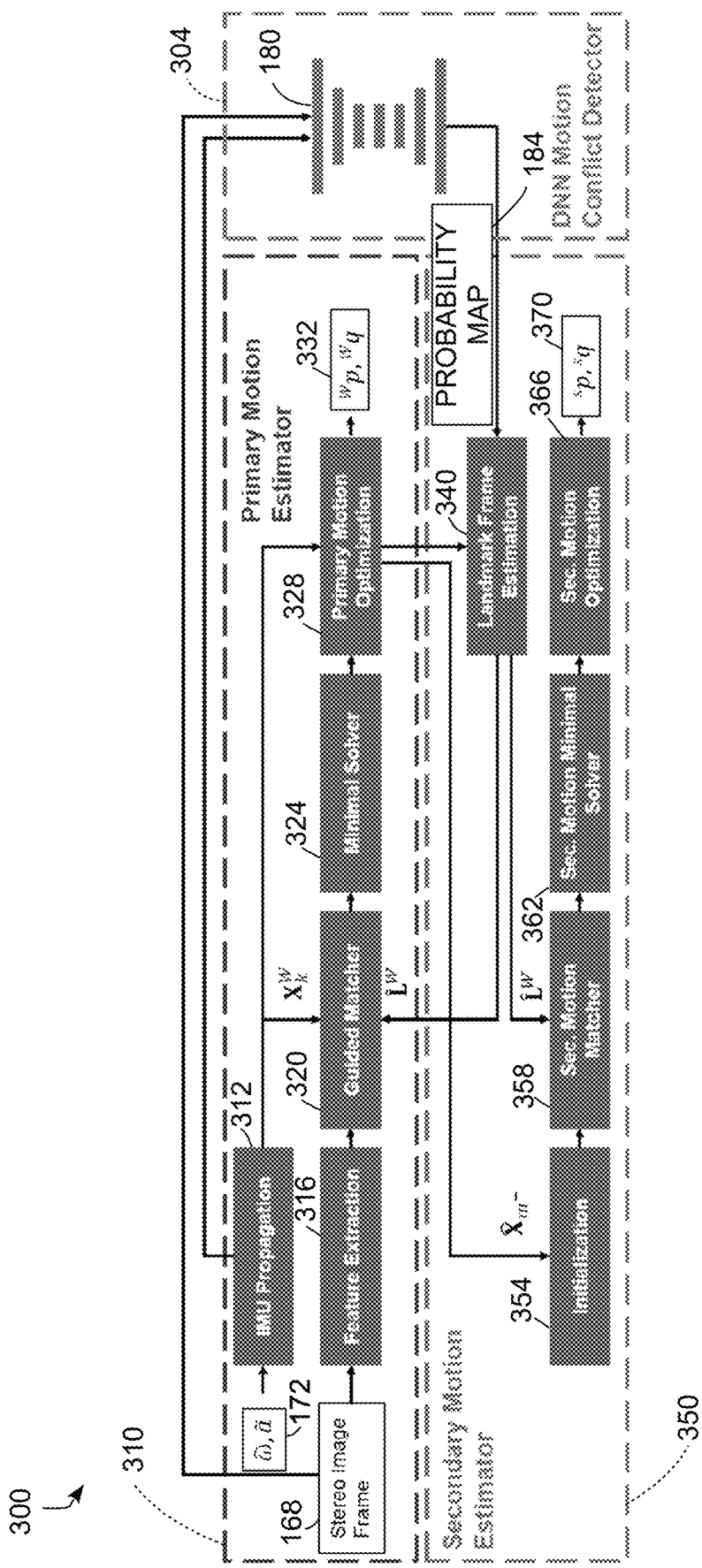
FIG. 3 is a diagram of a process for the operation of the AR system of FIG. 1 to estimate primary and secondary motion using the HMM of FIG. 2.

FIG. 3 depicts a process 300 that the AR system 100 of FIG. 1 implements to perform primary motion estimation and secondary motion estimation using the HMM 200 of FIG. 2 in situations where motion conflict occurs due to the presence of both an inertial coordinate frame and a local coordinate frame in the sensor data. In the discussion below, a reference to the process 300 performing a function or action refers to the operation of a processor, such as the processor 150, to execute stored program instructions to perform the function or action in conjunction with other components of an AR system. As described in more detail below, the process 300 includes the generation of a per-pixel conflict probability map, and the estimation of the primary motion and the secondary motion trajectories using the per-pixel conflict probability map to identify landmarks in frames of the input image data that correspond to the inertial coordinate frame and the local coordinate frame. The AR system 100 also generates graphics that augment the physical environment around the AR system 100 based on the estimates of primary motion and secondary motion trajectories. The process 300 is also referred to as a Multi-Motion Motion-Conflict Visual-Inertial Odometry (MC-VIO) process because the process 300 identifies motion conflict in inertial and local coordinate frames of the image data and uses the motion conflict to provide improved estimates of the primary motion and the secondary motion in a visual-inertial odometry process.

Per-Pixel Conflict Probability Map Generation

During the process 300, the processor 150 receives the image frame data 168 and the inertial sensor data 172, from the camera system 112 and the inertial sensors 116, respectively, in the AR glasses 104. The processor 150 uses both of the image frame data 168 and the inertial sensor data 172 as inputs to the deep neural network encoder/decoder 180 to generate the per-pixel probability map 184 (block 304).

Figure 4:
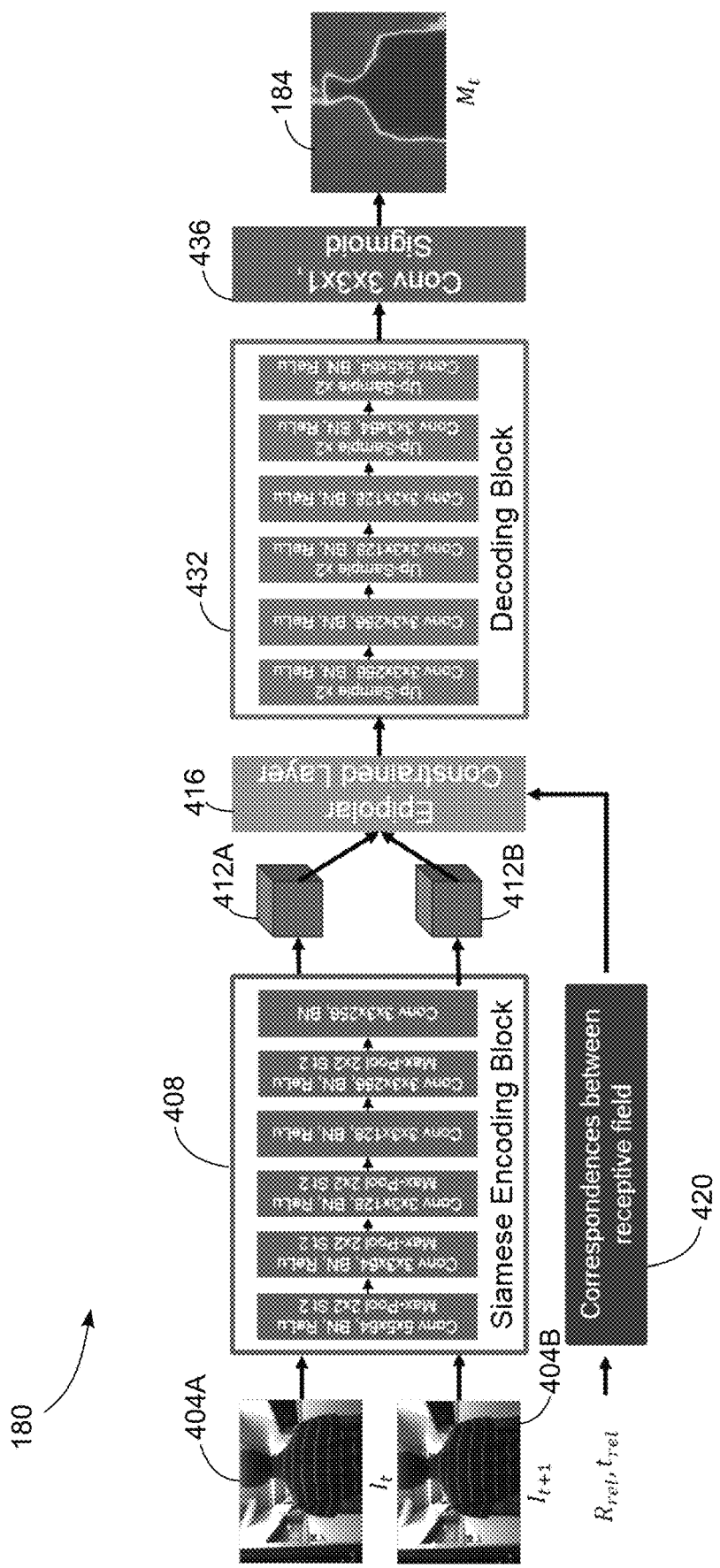
FIG. 4 is a diagram of a convolutional neural network (CNN) encoder/decoder that includes an epipolar constrained layer that the AR system of FIG. 1 uses in the process of FIG. 3.

FIG. 4 depicts the CNN encoder/decoder 180 with the epipolar constrained layer in more detail. The CNN encoder/decoder 180 includes a CNN encoder 408, an epipolar constrained layer 416, and a CNN decoder 432 that generates the output per-pixel probability map 184. The CNN encoder 408 produces outputs 412A and 412B based on the inputs of two input image frames 404A and 404B, which are two images taken at two different times including a previous-time image frame 404A (time t) and a present time image frame 404B (time t+1). In some embodiments, the input image frames are two consecutive frames in a video data sequence generated by the camera system 112, although in other embodiments the time difference between the two image frames may be greater than the time span between consecutive image frames in the video data.

The CNN encoder 408 extracts high dimensional features from the image frames 404A and 404B using a "Siamese" encoding process, which is to say that image frames 404A and 404B are both supplied to the CNN encoder 408 separately to produce the encoded outputs 412A and 412B, which correspond to the input image frames 404A and 404B, respectively. In particular, the CNN encoder 408 is trained once using a training process and the same CNN encoder structure with the trained weight values in the convolutional layers is used to generate encoded outputs 412A and 412B for both of the input image frames 404A and 404B. In some embodiments the processor 150 uses separate instances of the encoding block 408 to perform the encoding process in parallel.

The convolutional neural network encoder/decoder 180 is also referred to as a "deep" neural network encoder/decoder because the CNN encoder 408 and the CNN decoder 432 both include multiple layers that provide a convolutional layer, an activation function (the rectified linear unit ReLu used in the embodiment of FIG. 4), and a down-sampling (in the encoder 408) or up-sampling function (in the decoder 412) in each layer. In the example of FIG. 4, the CNN encoder 408 includes five convolutional layers. Each layer is followed by a batch normalization layer and a ReLU activation except for the final layer. The CNN encoder 408 removes ReLU activation function from the last convolutional layer to keep the negative values in the feature before the inner-product operations. Four max pooling layers were applied between the convolutional layers, which successively down-sample the intermediate outputs of the convolutional layers to generate outputs 412A and 412B. The two encoded outputs 412A and 412B include encoded features from the two original input image frames 404A and 404B. The term "receptive field" refers to a vector of elements in the encoded outputs 412A and 412B that correspond to a group of pixels in the original image frame data. The final probability map output 184 classifies pixels based on a combination of the encoded outputs 412A and 412B that is generated using the epipolar constrained layer 416, which receives the encoded outputs 412A and 412B as inputs.

In the embodiments described herein, the epipolar constrained layer 416 provides constraints between the encoded outputs 412A and 412B of two sets of image frame data that are generated over time (times t and t+1), with one example of a video system that generates image frames at a rate of 30 frames per second generating successive frames of image data at a rate of approximately one frame per 33.3 milliseconds. Due to movement of the AR system 100 over time, the two frames of image data also depict a spatial transformation that corresponds to the movement of the AR system between the times t and t+1. An epipolar line refers to an element that appears to be a single element (receptive field) in one of the two encoded outputs while appearing to be a line in the encoded output due to the movement of the elements over time between the two image frames from the perspective of the camera system 112.

As a simplified example of an epipolar line, a first image and corresponding encoded output from the CNN encoder 408 includes the end of a dowel rod that is seen end-on where a single receptive field in the first encoded output contains all of the information that is available about the dowel rod, which extends away from the camera in a depth dimension. A second image that is produced after the camera moves now shows the same dowel rod from another angle where the encoded output from the CNN encoder 408 presents the dowel rod as a line of elements because the second image depicts additional information about the dowel rod, and the line extending through the dowel rod represents all the information in a three-dimensional space that the second image encodes corresponding to the single element that is taken from the first image. Thus, the one receptive field that corresponds to the dowel rod in the first encoded output now corresponds to every receptive field in the second encoded output along the line, and a single zero-dimensional element now maps to a one-dimensional arrangement of elements. In the AR system 100, the inertial sensor data from the inertial sensors 116 provide information that enables the processor 150 to identify the changes in the angle between the first and second images of the dowel rod in this example and, more generally, to any set of two images from the camera system 112. Similar epipolar lines are present in other sets of two image inputs based on the movement of the AR system 100 between the generation of the two images as well, and the AR system 100 uses the geometric relationship between the movement of the camera and the encoded outputs of the two images to identify the epipolar lines.

In FIG. 4, the correspondence between receptive fields block 420 represents a processing operation that is implemented using the processor 150 to identify a correspondence between relative receptive field elements in both of the encoded outputs 412A and 412B based on the motion of the AR system 100 that is identified in the sensor data received from the inertial sensors 116 during the time period from t to t+1 that corresponds to movement of the AR system 100 between the times at which the camera system 112 generates the frames of image data. Over a short period of time between the two frames, the inertial sensor data provides a sufficiently accurate measurement of the movement of the camera system 112 in the AR device 100 to enable the processor 150 to identify the epipolar lines in the receptive fields of the encoded output 412B that correspond to individual receptive fields in the first encoded output 412A. Thus, the AR system 100 uses both video frames from the camera system 112 as inputs to the CNN conflict detector 180 and uses inertial data from the inertial sensors 116 to identify the mapping between receptive fields and the epipolar lines in the epipolar constrained layer 416. The epipolar constrained layer 416 "constrains" each receptive field from the first encoded output 412A to correspond only to a single line of receptive fields in the second encoded output 412B instead of potentially having each receptive field element in the first encoded output 412A correspond to any of the receptive field elements in the second encoded output 412B, which improves the accuracy of the subsequent CNN decoder 432.

Figure 5:
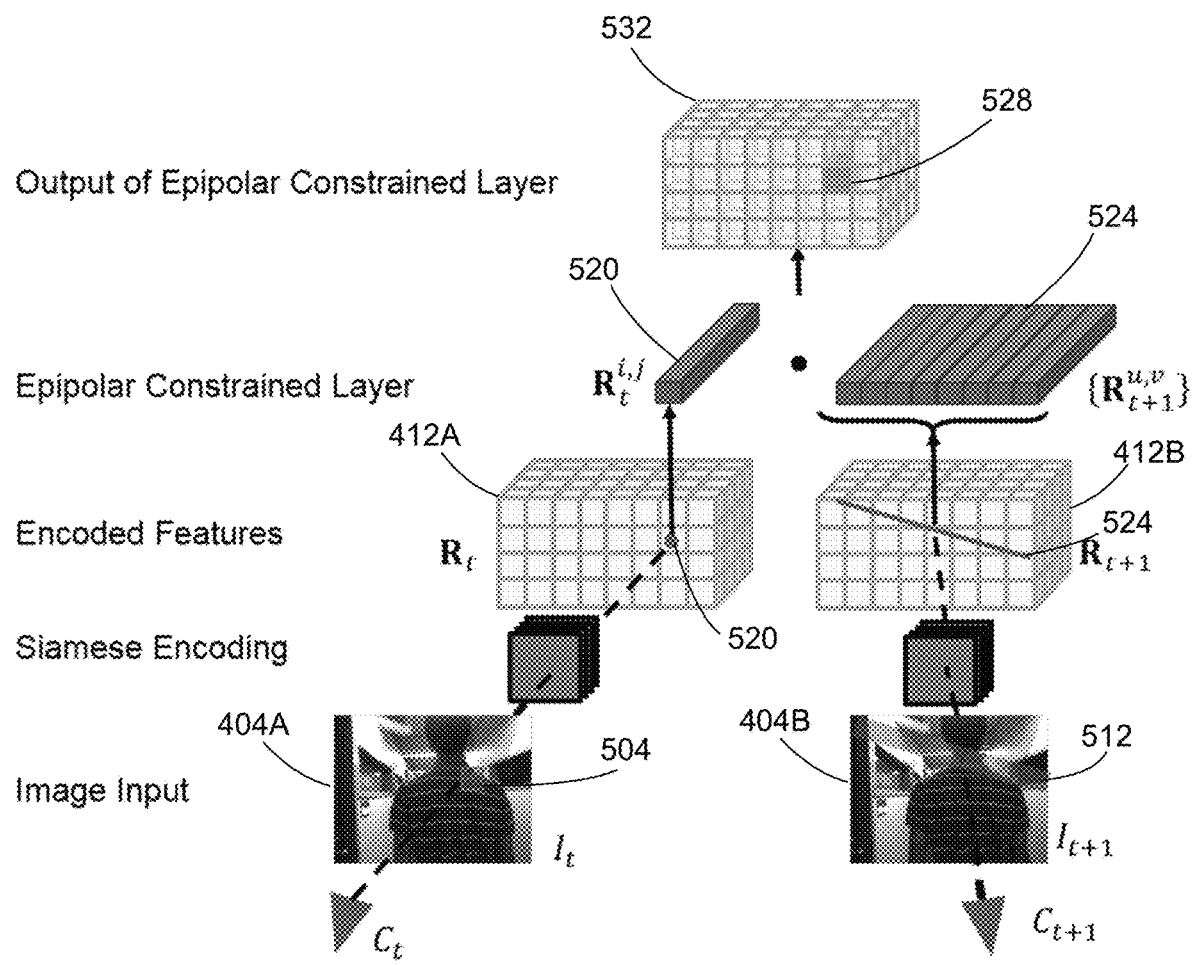
FIG. 5 is a diagram depicting operation of the epipolar constrained layer in the convolutional neural network encoder/decoder of FIG. 4.

FIG. 5 depicts the structure and operation of the epipolar layer 416 in greater detail. The epipolar constrained layer 416 uses the inertial information for the purpose of motion conflict detection. As described above, the epipolar lines reduce the search dimension of potential matches from two dimensions to one dimension. In FIG. 5, a single receptive field 520 in the first encoded output 412A from the previous time t corresponds to an entire epipolar line 524 of receptive fields in the second encoded output 412B from the present time t+1. As depicted in FIG. 4 and FIG. 5, the encoded outputs 412A and 412B are three-dimensional structures that form a series of reduced-resolution encoded representations of a corresponding input image, where each reduced-resolution representation contains encoded features that are produced by the CNN encoder 408. FIG. 5 depicts a vector 520 ($R_t^{i,j}$) of a single receptive field at coordinates i,j in the encoded output 412A ($R_t$), which is a receptive field that corresponds to a two-dimensional array of pixels 504 from the first input image frame 404A. The depth dimension of the receptive field vector 520 $R_t^{i,j}$ represents a series of encoded features that the CNN encoder 408 generates, with each encoded feature in the receptive field vector 520 pertaining to the array of pixels 504 in the first image frame. Thus, each receptive field spatially corresponds to a two-dimensional region of the original input image, but the encoded outputs 412A and 412B are three-dimensional because each receptive field produces multiple encoded features for the same spatial region. In the illustrative embodiment of FIG. 4, the CNN encoder 408 produces a total of 256 features for each receptive field element in the outputs 412A and 412B. FIG. 5 depicts an epipolar line 524 ($R_{t+1}^{u,v}$) that the processor 150 identifies in the encoded output 412B of the second input image frame 404B. The epipolar line 524 includes a linear arrangement of receptive fields, which forms a two-dimensional matrix of encoded features. The epipolar line 524 is represented mathematically as L={u, v|au+bv+c=0} in a u, v coordinate space where the a, b, and c terms are coefficients of the epipolar line that the processor 150 identifies using the inertial sensor data to identify the geometric relationship between the encoded outputs 412A and 412B based on the movement of the AR system between the generation of the two input images 404A and 404B. The linear arrangement of receptive fields in the epipolar line 524 corresponds to a swath of pixels 512 in the second image data frame 404B.

During the process 300, the processor 150 generates an inner-product (dot product) of the receptive field 520 from the first encoded output 412A and the epipolar line of receptive fields 524 from the second encoded output to produce the combined output element 528, which is another vector corresponding to the inner product of the receptive field 520 and the array of receptive fields 524. Each output vector (EC) of the epipolar constrained layer is represented mathematically as: $EC^{i,j} = \{R_t^{i,j} \cdot R_{t+1}^{u,v} | au+bv+c=0\}$. The processor 150 performs the same operation for each of the receptive fields in the first encoded output 412A with epipolar lines of receptive fields from the second encoded output 412B to produce the final output 532 of the epipolar constrained layer 416, which combines the original encoded outputs 412A and 412B to form the input for the CNN decoder 432. The final output of the epipolar layer 532 forms the input for the neural network encoder in the neural network encoder/decoder as a block $H_{rf} \times W_{rf} \times \max(W_{rf}, H_{rf})$ of the elements $EC^{i,j}$ where $H_{rf}$ is the height of the encoded inputs 412A/412B and $W_{rf}$ is the width of the encoded inputs 412A/412B.

In the CNN encoder/decoder 180, the CNN decoder 432 receives the combined output of the epipolar constrained layer 416. The CNN decoder 432 includes five de-convolutional layers that successively deconvolve the input from epipolar constrained layer 416 and four up-sampling layers to generate an output with an equivalent resolution to the original input image 404B. The CNN decoder 432 applies a 3×3×1 convolutional layer with a sigmoid activation function to generate the final per-pixel probability map 184. The CNN decoder 432 generates the per-pixel probability map 184 with a probability value indicating the probability that each pixel in the second image 404B is either in the inertial coordinate frame or the local coordinate frame. As described above, each element in the per-pixel probability map 184 includes a numeric value in the range [0.0, 1.0] to indicate the probability of the corresponding pixel in the image frame 404B corresponding to the inertial coordinate frame or the local coordinate frame.

Figure 6:
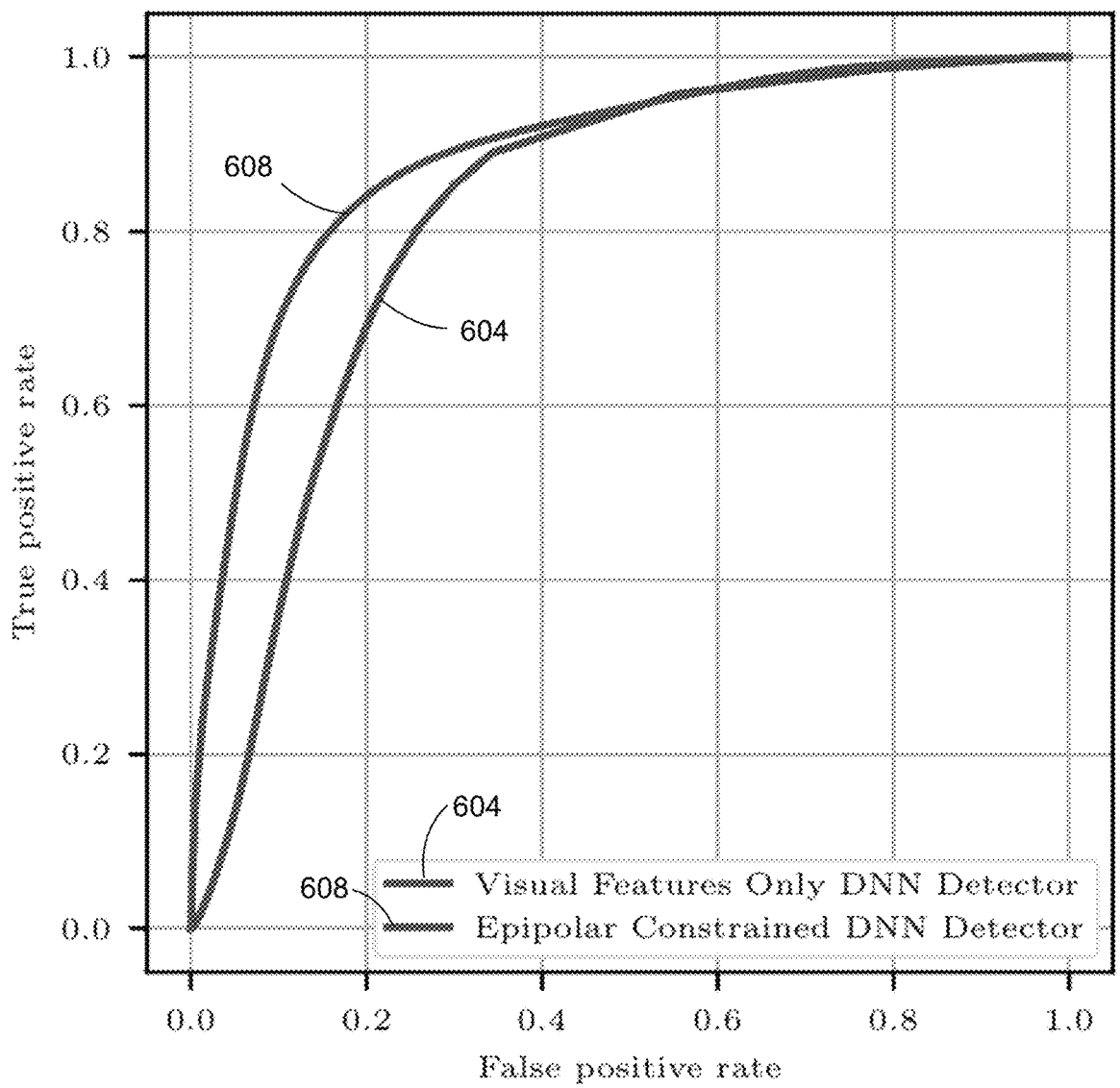
FIG. 6 is a receiver operating characteristic (ROC) graph that depicts the ratios of true-positive detection to false-positive detection for the CNN encoder/decoder of FIG. 4 compared to a CNN encoder/decoder that lacks the epipolar constrained layer.

FIG. 6 is a receiver operating characteristic (ROC) graph 600 that depicts the ratios of true-positive detection (vertical axis) to false-positive detection (horizontal axis) in the per-pixel probability maps that the CNN encoder/decoder 180 using the epipolar constrained layer generates (plot 608) compared to another CNN encoder/decoder that does not use the epipolar constrained layer (plot 604). As depicted in the graph 600, the true-positive rate for the plot 608 exceeds 80% (0.8) before the false-positive rate reaches 20% (0.2), which indicates a higher degree of accuracy for the CNN encoder/decoder 180 using the epipolar constrained layer. The plot 604, by contrast, exhibits a lower rate of true-positive detection while producing a higher proportion of false-positive detections that occur because the embodiment of the CNN encoder/decoder that produces the plot 604 does not include the epipolar constrained layer.

The per-pixel motion conflict probability map 184 improves the estimated primary motion and the secondary motion in at least two ways. First, it enables better outlier rejection in the primary motion estimation. Second, it helps determine the visual measurements that can be used for secondary motion estimation. One of the main challenges in Multi-motion MC-VIO is to keep the computational complexity of the algorithm low while performing robust secondary motion estimation with limited measurements.

The process 300 uses the CNN encoder/decoder 180 to generate the per-pixel probability map 180 after the CNN encoder/decoder 180 has been trained, which occurs prior to the process 300. In one embodiment, the training process uses a variant of stochastic gradient descent training process, which automatically adjusts the per-dimension learning rate. The training process minimizes a pixel-wise binary cross-entropy loss based on the following minimization process: min $\Sigma_i \Sigma_j - \hat{y}_{i,j} \log(y_{i,j}) + (1-\hat{y}_{i,j})\log(1-y_{i,j})$. During a testing phase, the CNN encoder/decoder 180 predicts the per-per-pixel probability map 184 for every frame of a test video sequence and provides the per-pixel probability map 184 to the VIO system to test the accuracy primary and secondary motion estimation using predetermined test data.

Primary Motion Estimation

During the process 300, the primary motion estimation process (block 310) uses both the image frame data 168 and the inertial sensor data 172 as inputs to perform primary motion estimation of the AR system 100 relative to the inertial coordinate frame. The primary motion states $X^W_1$, $X^W_2$ in the group 240 provide a simplified view of primary motion states. In the notation described herein, the term W refers to the inertial coordinate frame ("world" frame). The input to the primary state estimator includes the visual observations z and the inertial sensor measurements u=[$\tilde{\omega}$, $\tilde{a}$], In more detail, the primary motion trajectory states are represented as $^WX_{0:N}$ where each state $X^W_k$ is: $X^W_k := [^Wp_{WS}^\tau, q_{WS}^\tau, {}^Sv_{WS}^\tau, b_g^\tau, b_a^\tau, {}^Wl_0^\tau, \ldots, {}^Wl_n^\tau]_k^\tau \in \mathbb{R}^3 \times S^3 \times \mathbb{R}^9 \times \mathbb{R}^{4n}$. The term $^Wp_{WS}$ refers to the pose of the AR system, the term $q_{WS}$ refers to the orientation of the AR system, $^Sv_{WS}$ refers to the velocity, and the terms $b_g^\tau$, $b_a^\tau$ represent linear acceleration and rotational velocity biases in the inertial sensor data. The terms $^Wp_{WS}$, $q_{WS}$, $^Sv_{WS}$ use the W notation to indicate that these elements are relative to the inertial coordinate frame. The $^Wl_0, \ldots, {}^Wl_n$ represent visual landmarks that are estimated in the HMM 200 in the node 250. The "τ" notation used in this expression and other expressions herein indicates a matrix transpose.

As depicted in FIG. 3, the primary motion estimation process of block 310 includes feature extraction (block 316), guided matching (block 320), a minimal solver (block 324), and the primary motion optimization process (block 328). The primary motion estimation process produces the output 332 that includes estimated pose ($^Wp$) and the estimated orientation ($^Wq$) for the primary motion.

In the feature extraction of block 316, the processor 150 extracts visual measurements z from the frames of image data 168. In one embodiment, the processor 150 uses the FAST and BRISK techniques described above in the feature extraction process to identify the visual observations.

The process 300 continues with guided matching that generates a set of landmarks using the features that are extracted from multiple images in addition to the inertial sensor data and information stored in the states of the HMM 200 (block 320). The term "guided" part of guided matching refers to the use of a previous-time state $^WX_{k-1}$ in the HMM 200 to serve as a basis for a "propagation" estimation process that generates another "a priori" state $^WX_k$ in the HMM 200. The a priori state $^WX_k$ is often not the correct state for estimating the primary motion, but generally provides enough information to be used in a matching process that identifies landmarks in the image data, which the AR system 100 later uses in conjunction with the per-pixel probability map to actually identify the final state in the HMM 200 that contains the estimated primary motion.

The processor 150 propagates the previous primary motion state estimate $^WX_{k-1}$ to estimate the new a priori state $^WX_k$. The processor 150 uses the following equations with the inertial sensor data elements $^B\tilde{\omega}_{WB}$ and $^S\tilde{a}_{WS}$ to perform the propagation:

$$w_{\dot{p}} = (C_{WB})(^Bv)$$

$$\dot{q}_{WB} = \frac{1}{2}\Omega(^B\tilde{\omega}_{WB} - b_g)q_{WB}$$

$$^{S\prime}\dot{v}_{WS} = (^S\tilde{a}_{WS} - b_a) + {}^Wg;$$

$$\dot{b}_g = n_{bg};$$

$$\dot{b}_a = \frac{1}{\tau}b_a + n_{ba}.$$

The propagation equation took as input inertial measurements ($\tilde{\omega}$, $\tilde{a}$) collected in the body frame B. The processor 150 uses the a priori state to guide the matcher, which generates visual correspondences between images at two different timestamps (temporal matches) and, in embodiments that use a stereoscopic camera system 112, between two images at the same timestamp (static matches). The processor 150 then uses the correspondences as visual measurements z. When sufficient visual measurements of a landmark are available, the processor 150 performs triangulation initialize the landmark in the state estimator. The triangulation process identifies landmarks based on changes in the relative positions of matching visual observations over a series of image frames. Once again, while a landmark does not move, the movement of the camera system 112 in the AR system 100 produces changes in the perceived locations of the visual observations of landmarks over time, and the processor 150 performs the triangulation process to identify landmarks in the HMM 200.

The process 300 continues with a minimal solver process (block 324) that the processor 150 uses to identify residuals (errors) between predictions and observations. In the process 300, the processor 150 identifies residuals (error) based on the observed inertial measurements as:

$$e_s^k(X_k, X_{k+1}, z_k, u_{k-1:k}) = \begin{bmatrix} w_{p_k} - w_{p_k} \\ 2(\hat{q}_k \oplus q_k^{-1}) \\ s_{\hat{v}_k} - s_{v_k} \\ \hat{b}_{gk} - b_{gk} \\ \hat{b}_{ak} - b_{ak} \end{bmatrix}$$

The processor 150 also identifies residuals of the observed visual measurements are represented as: $e_r^{i,j,k} := z^{i,j,k} - \pi_i(T_{CB}\hat{T}_B w^W l_j)$.

The processor 150 uses the residuals to perform a windowed batch optimization process (block 328) to minimize the following energy: $\mathcal{J}(X_k^W) := \Sigma_{k=1}^K \Sigma_i \Sigma_{j \in J(k,i)} e_r^{i,k,j^\tau} w_r e_r^{i,k,j} + \Sigma_{k=2}^K e_s^{k^\tau} w_s e_s^k$. In the preceding equation, the $\Sigma_{k=1}^K \Sigma_i \Sigma_{j \in J(k,i)} e_r^{i,k,j^\tau} w_r e_r^{i,k,j}$ term represents a reprojection error, and the $\Sigma_{k=2}^K e_s^{k^\tau} w_s e_s^k$ term represents a prediction error. The reprojection error represents an error that occurs due to the difference between the actual three-dimensional position of a landmark compared to the estimated position that the AR system 100 generates from the triangulation since the estimation is made using a series of two-dimensional images that act as projections of the three-dimensional physical space around the AR system 100. The prediction error represents the error between the initial prediction from the HMM 200 based on the previous state and the present time inertial sensor inputs and the actual primary motion. The term "energy" does not correspond to a physical energy quantity, but instead refers to a measurement of the total level of error as an energy quantity, where the windowed batch optimization process searches states in the HMM 200 that have connections to the previous-time state $X_{k-1}^W$ to find the next state $X_k^W$ that produces the smallest energy (error) value. The AR system 100 then selects the next state $X_k^W$ in the HMM 200 and uses the embedded values $^W p_{WS}$, $q_{WS}$ in the selected state $X_k^W$ that correspond to the pose and the orientation, respectively, as the estimated output trajectory data 332.

Secondary Motion Estimation

As depicted in FIG. 3, the secondary motion estimation process (block 350) includes initialization (block 354), secondary motion matching (block 358), a secondary minimal solver (block 362), and the secondary motion optimization process (block 366). The secondary motion estimation process 350 also includes the landmark frame estimation processor 340 that provides estimates of landmarks in the inertial coordinate frame to the guided matcher 320 and estimates of landmarks in the local coordinate frame to the secondary motion matcher 358. The secondary motion estimation process of block 350 produces a secondary motion estimation output 370 that includes an estimate of pose ($^V p_{VB}$) and an estimate of the orientation ($q_{VB}$).

The secondary motion estimates the state $X_k^{S_n}$ with the secondary state being defined as: $X_k^{S_n} := [^V p_{VB}^\tau, q_{VB}^\tau, ^V l_0^\tau, \ldots, ^V l_n^\tau]_k^\tau \in \mathbb{R}^3 \times S^3 \times \mathbb{R}^{4n}$. In the notation described herein, the term V refers to the local coordinate frame. Where $^V p_{VB}$ and $q_{VB}$ represent the estimated pose and orientation, respectively, with respect to the local coordinate frame, and $^V l_0, \ldots, ^V l_n$ represent landmarks that are identified as being in the local coordinate frame using the per-pixel probability map. As described above, the secondary states in the HMM 200 do not include parameters that are based on the inertial sensor data 172 because the secondary motion in the local coordinate frame is only estimated based on portions of the image frame data 168 that correspond to the local coordinate frame as identified using the per-pixel probability map 184.

In the process 300, the processor 150 initializes the secondary motion estimator to the state $X_{m-}$ (state 210C in the HMM 200 of FIG. 2), which represents the final state before the start of the secondary motion tracking (block 354).

The process 300 continues as the processor 150 performs a secondary motion matching process (block 358). The secondary motion matching process 358 is similar to the guided matching process of block 320 in the primary motion estimation process, but in the secondary motion matching process the processor 150 uses the per-pixel probability map 184 (M) to identify landmarks that have a high probability of corresponding to the local coordinate frame to perform the secondary motion matching process. This increases the accuracy of secondary motion estimation by reducing or eliminating the influence of landmarks from the inertial coordinate frame in the secondary motion estimation.

During the process 300, the processor 150 performs the landmark frame estimation to determine if a landmark belongs to the inertial coordinate frame for the primary motion estimation process of block 310 or the local coordinate frame for the secondary motion estimation process of block 350 (block 340). If the processor 150 identifies a marginal probability for a landmark belonging to the local coordinate frame that is greater than a predetermined probability threshold, such as a greater than 50% probability, then the processor 150 assigns the landmark to the secondary map and move all the associated residuals, $e_r^{i,j,k}$ to the secondary motion estimator. The marginal probability that a landmark is in the local coordinate frame based on all the visual observations $z_i$ of the landmark $L_i$ is given by:

$$P(^V l_i | S_n, M) = \sum_j^N \frac{P(z_j | l_i, M)}{P(z_j)}.$$

This process implicitly removes landmarks from the primary motion estimation process of block 310 above. Thus, while the primary motion estimation process does not directly employ the per-pixel probability map 184, the processor 150 uses the per-pixel probability map 184 to divide the landmarks between the primary and secondary motion estimation processes, which improves the accuracy of both processes. The processor 150 performs temporal matching of the landmarks in the secondary map with the current frame to generate additional visual measurements.

A generalized P3P was combined with RANSAC to estimate the pose associated with the secondary map. The process 300 the processor 150 performs a secondary motion minimal solver process (block 362) to identify the residual: $e_r^{i,j,k} := z^{i,j,k} - \pi_i(T_{CB}\hat{T}_{BS}^S l_j)$ This is process is similar to the primary motion minimal solver of block 324 above, but in the secondary motion estimation process of block 350 the processor 150 only identifies the residual $e_r^{i,j,k}$ corresponding to the errors between the visual observations $z^{i,j,k}$ and the estimated landmarks because the AR system 100 does not use inertial data to perform the secondary motion estimation process.

The processor 150 uses the residual to perform a windowed batch optimization process for the secondary motion estimation (block 366) to minimize the following energy:

$\mathcal{J}(X_k^{S_n}) := \Sigma_{k=1}^K \Sigma_t \Sigma_{j \in J(k,t)} e_r^{i,k,j^T} w_r e_r^{i,k,j}$. In this equation, the only error is the reprojection error and there is no prediction error term from the inertial sensor measurements. The AR system 100 then selects the next state $X_k^{S_n}$ in the secondary states of the HMM 200 and uses the embedded values $^V p_{WS}$, $q_{WS}$ in the selected state $X_k^{S_n}$ that correspond to the pose and the orientation, respectively, as the estimated output trajectory data 370.

same sets of inertial and image input data, including both of the images 720 and 724 that produced errors in the prior-art VIO systems.

Figure 7:
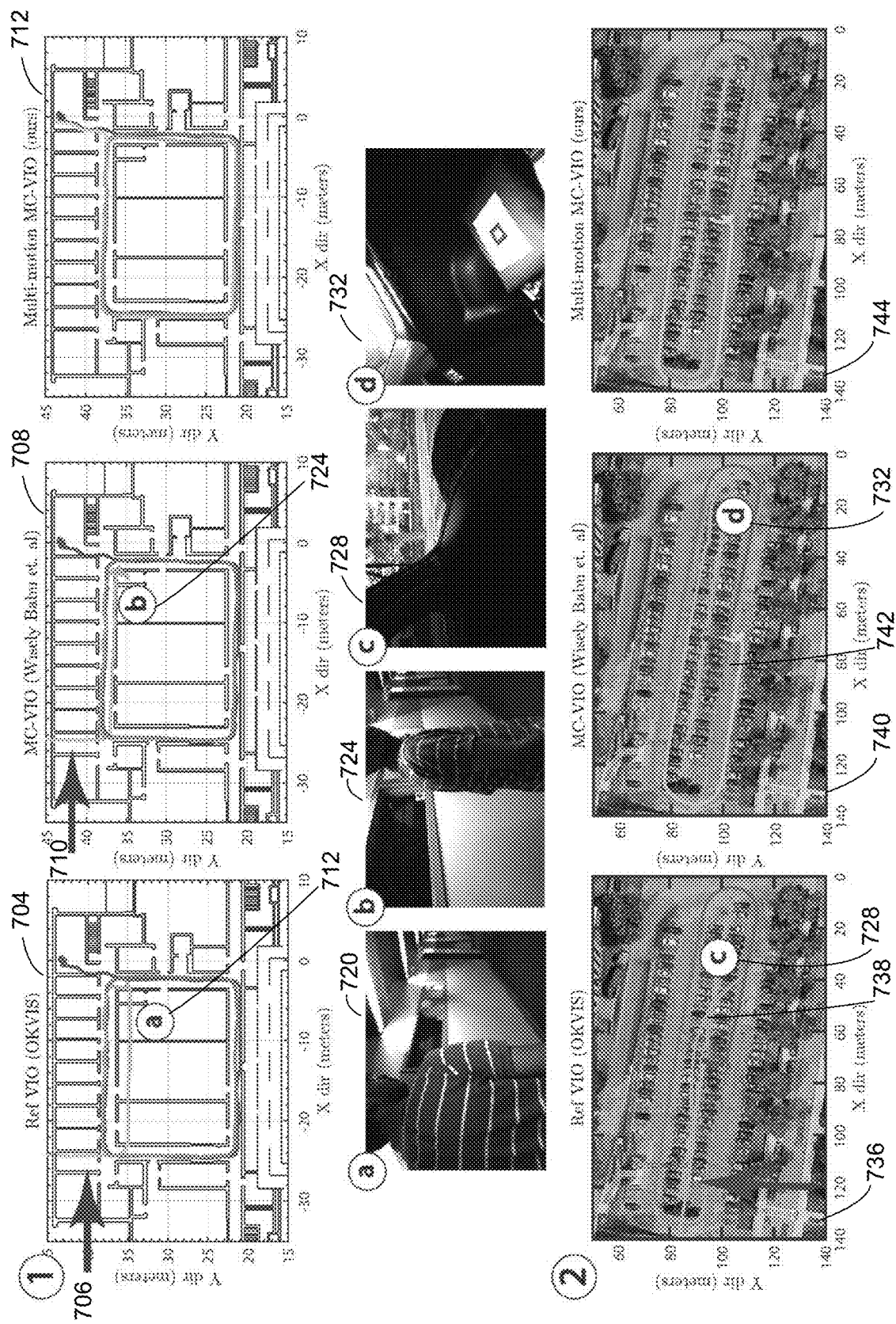
FIG. 7 is a diagram depicting the accuracy of visual-inertial odometry in an environment that includes both inertial and local coordinate frames using the AR system of FIG. 1.

In addition to the results of FIG. 7, the following table depicts the absolute tracking error (ATE) in meters and the relative pose error (RPE) in meters per second for the embodiments described herein compared to the prior-art OKVIS and Wiley Baby MV-VIO AR systems using three motion sequences that include both inertial and local coordinate frames in the input sensor data. As depicted below, the embodiment of the system 100 that performs the process 300 exhibits superior performance on nearly all metrics and matches the Wiley Babu implementation in RPE standard deviation.

| | ATE [m] | | | RPE [m/s] | | |
|---|---|---|---|---|---|---|
| Dataset | OKVIS | Wisely Babu | System 100 | OKVIS | Wisely Babu | System 100 |
| Seq1 | 4.979 | 4.681 | 0.568 | 0.052 | 0.047 | 0.018 |
| Seq2 | 4.873 | 6.391 | 0.142 | 0.052 | 0.051 | 0.010 |
| Seq3 | 27.22 | 2.740 | 1.932 | 0.252 | 0.065 | 0.029 |
| Mean | 12.35 | 4.604 | 0.881 | 0.119 | 0.054 | 0.019 |
| Standard Deviation | 10.51 | 1.492 | 0.763 | 0.094 | 0.008 | 0.008 |

Improvements to Operation of the AR System

As described above, the AR system 100 uses the process 300 to generate estimates of the primary motion trajectory and the secondary motion trajectory. The accurate estimation of these trajectories enables the AR system 100 to perform visual-inertial odometry with greater accuracy and to generate augmented graphics for display to a user with greater accuracy in environments that include both inertial and local coordinate frames.

FIG. 7 depicts improvements to visual-inertial odometry (VIO) in more detail. In a VIO operation, the AR system 100 tracks its location in an environment using the estimated trajectories in the inertial coordinate frame. In two practical examples shown in FIG. 7, the VIO process tracks the movement of the AR system 100 while a user walks in a circuit around an office while viewing another person, who is also moving, and in another example a user rides in a motor vehicle in a circuit around a parking lot starting from a parking spot and returning to the same parking spot. In both examples, the AR system 100 receives sensor data from both the inertial coordinate frame of the office or parking lot and the local coordinate frame of either the other person in the view of the camera system 112 or the interior of the motor vehicle. FIG. 7 depicts errors in the VIO operation as deviations from the path of the user as the user walks around an office or of the user in the vehicle as the vehicle travels around the parking lot.

Figure 8A:
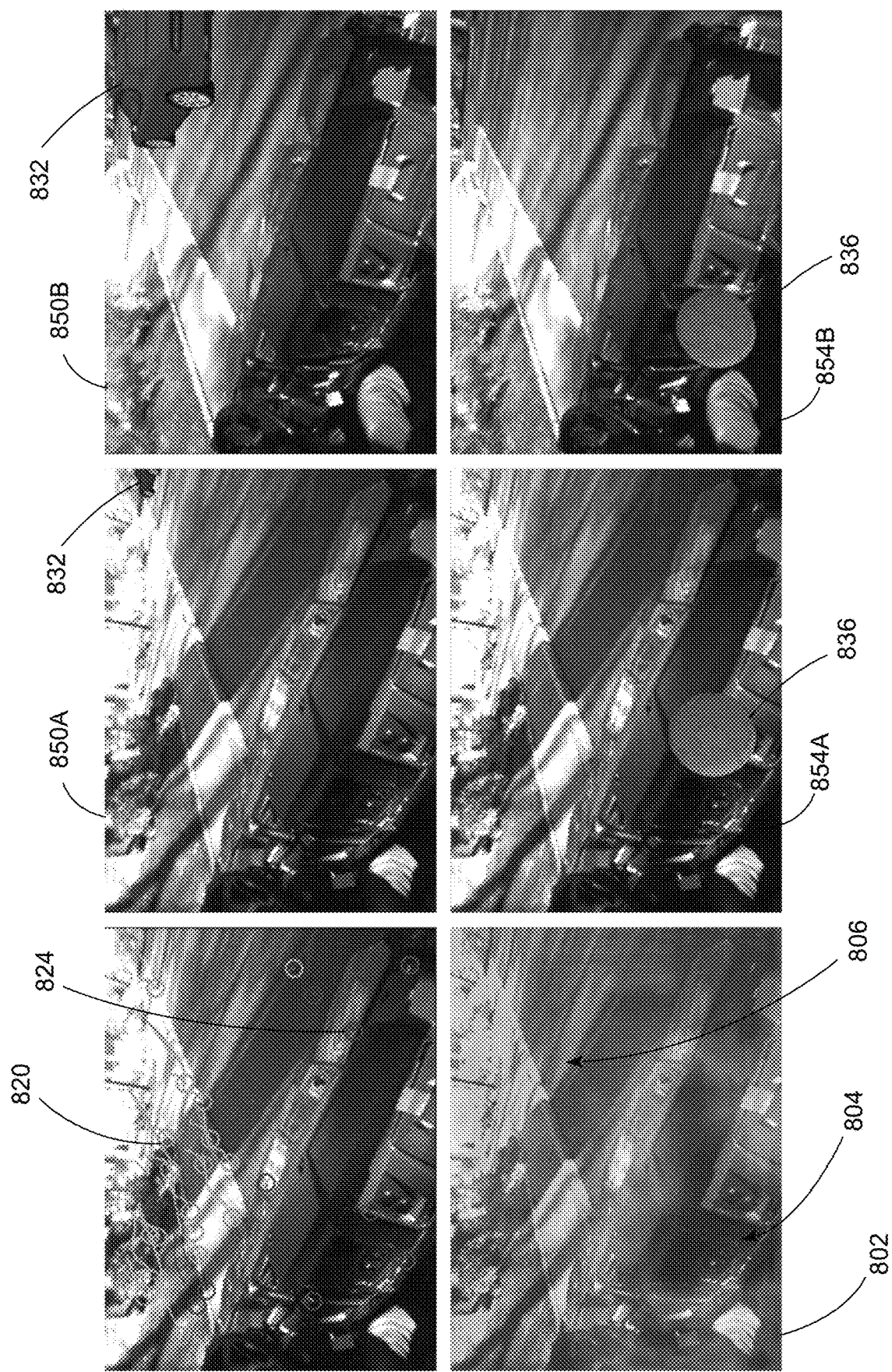
FIG. 8A is a diagram depicting the identification of an inertial coordinate frame and a global coordinate frame with landmarks and augmented graphics generated in the AR system of FIG. 1.
Figure 8B:
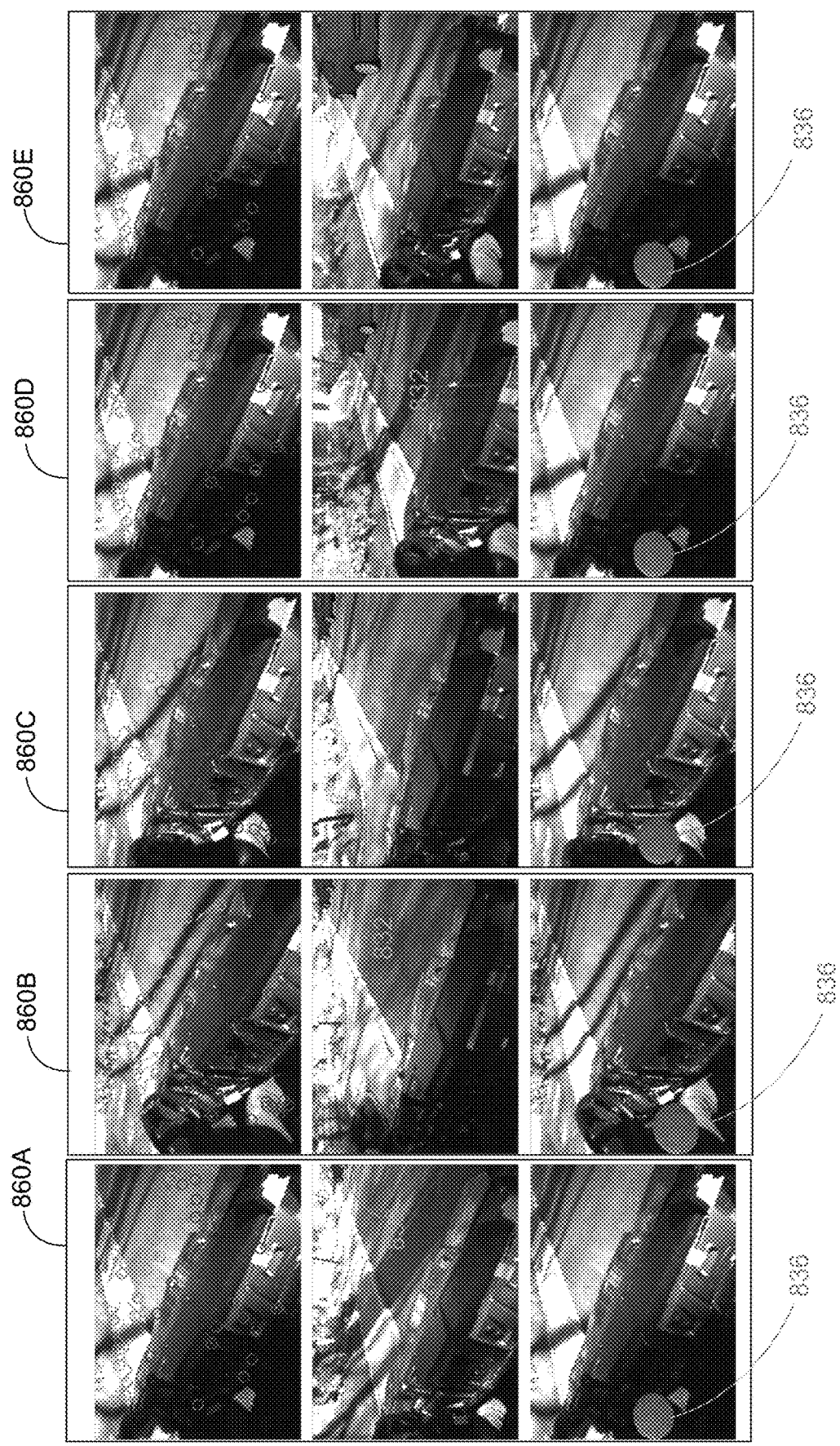
FIG. 8B is another diagram depicting the operation of the AR system of FIG. 1 to produce augmented graphics with accurate locations in both an inertial coordinate frame and a local coordinate frame.

In more detail, FIG. 7 depicts maps 704 and 708 of the VIO data that are generated using two prior-art VIO systems, including the OKVIS (704) and Wisely Babu (708) VIO systems. Both of these VIO system produce tracking errors due to the presence of a moving person in the field of view of a camera sensor, with representative images that cause errors in the prior art shown in the photograph 720 for the map 704 and photograph 724 for the map 708. FIG. 7 depicts large tracking errors 706 and 710 in the maps 704 and 708, respectively, which reduce the effectiveness of the prior-art VIO systems. In contrast, the map 712 depicts VIO that is performed using the AR system 100 of FIG. 1 using the Multi Motion MC-VIO process 300 to perform primary and secondary motion estimation with greater accuracy given the The improvements to the accuracy of VIO that are described above also enable the AR system 100 to generate augmented graphics for display to a user with accurate placement of the augmented graphics in portions of the physical environment that correspond to both the inertial coordinate frame and the local coordinate frame. FIG. 8A and FIG. 8B depict the operation of the AR system 100 to generate augmented graphics in greater detail. FIG. 8A depicts the view of a physical environment that includes a road and other fixed features (inertial coordinate frame) as well as the interior of a vehicle (local coordinate frame). The images can be generated using the camera system 112 in the AR system 100. The photograph 802 includes an overlay with a graphical depiction of the per-pixel probability map 184 that includes a region 184 corresponding to the inertial coordinate frame of the road and another region 804 corresponding to the local coordinate frame of the vehicle interior. While the AR system 100 generally does not produce a graphical depiction of the per-pixel probability map 184, the photograph 802 provides an illustrative embodiment of the per-pixel probability map 184. Additionally, the photograph 820 includes graphical indicia for landmarks that the system 100 detects based on both the frames of image data from the camera system 112 and the inertial sensor data from the inertial sensors 116, with an example of a landmark 820 that is used only for primary motion estimation in the inertial coordinate frame and the landmark 824 that is used only for secondary motion estimation in the local coordinate frame.

FIG. 8A also depicts graphical elements that the AR system 100 generates in alignment with either the inertial coordinate frame or the local coordinate frame to augment the view of the physical environment. In photographs 850A and 850B, the AR system 100 generates a 3D graphical view of a virtual vehicle 832 that is parked on the side of the street in the inertial coordinate frame. In the AR system 100, the processor 150 uses the AR graphics data 188 to generate the graphical depiction of the vehicle 832 using the primary motion estimation from the process 300 to place the virtual vehicle 832 at a location on the road that remains aligned with the inertial coordinate frame in a consistent location from the perspective of the user as the user rides in a moving vehicle. The user views the virtual vehicle 832 through the lenses 108A/108B along with the physical environment depicted in FIG. 8A. The AR system 100 can also generate virtual graphics that are aligned with the local coordinate frame. As depicted in the photographs 854A and 854B, the processor 150 generates a virtual globe 836 that remains in a fixed location relative to the dashboard of the interior of the vehicle in the local coordinate frame. Once again, the processor 150 uses the graphics data 188 to generate the virtual globe 836 and uses the secondary estimated motion to display the virtual globe 836 in a consistent location within the local coordinate frame as the user moves relative to both the local coordinate frame and the inertial coordinate frame. FIG. 8B includes additional photographs 860A-860E that depict landmarks, the virtual vehicle 832, and the virtual vehicle 836 during operation of the AR system 100. While not expressly shown in FIG. 8A and FIG. 8B, the AR system 100 can display graphics of both the virtual vehicle 832 in the inertial coordinate frame and the virtual globe 836 in the local coordinate frame simultaneously due to the improvements to primary motion estimation and secondary motion estimation that are provided by the embodiments described herein.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for motion estimation in an augmented reality (AR) system comprising:
   receiving, with an inertial sensor system, inertial sensor data during movement of the AR system;
   receiving, with a camera system, a plurality of frames of image data during the movement of the AR system;
   generating, with a processor implementing a convolutional neural network encoder/decoder, a probability map based on the inertial sensor data and the plurality of frames of image data, the probability map corresponding to one frame in the plurality of frames of image data and including a plurality of probability values corresponding to a plurality of pixels in the one frame, each probability value in the plurality of probability values indicating a probability that the corresponding pixel is in an inertial coordinate frame or a local coordinate frame;
   identifying, with the processor, visual observations of at least one landmark in the local coordinate frame based on the plurality of frames of image data and the probability map; and
   generating, with the processor, an estimate of secondary motion for the AR system with reference to the local coordinate frame based on a first prior state in a hidden Markov model (HMM) corresponding to the local coordinate frame and the visual observations of the at least one landmark in the local coordinate frame.

2. The method of claim 1 further comprising:
   generating, with a display device in the AR system, a graphical element that is aligned to the local coordinate frame based on the estimate of secondary motion for the AR system.

3. The method of claim 1 further comprising:
   identifying, with the processor, visual observations of at least one landmark in the inertial coordinate frame based on the plurality of frames of image data and the probability map, the at least one landmark in the inertial coordinate frame being different than the at least one landmark in the local coordinate frame; and
   generating, with the processor, an estimate of primary motion for the AR system with reference to the inertial coordinate frame based on a second prior state in the HMM corresponding to the inertial coordinate frame, the inertial sensor data, and the visual observations of the at least one landmark in the inertial coordinate frame.

4. The method of claim 3 further comprising:
   generating, with a display device in the AR system, a graphical element that is aligned to the inertial coordinate frame based on the estimate of primary motion for the AR system.

5. The method of claim 3 further comprising:
   generating, with a display device in the AR system, a first graphical element that is aligned to the local coordinate frame based on the estimate of secondary motion for the AR system; and
   generating, with the display device in the AR system, a second graphical element that is aligned to the inertial coordinate frame based on the estimate of primary motion for the AR system.

6. The method of claim 1, further comprising:
   receiving, with the camera system, the plurality of frames of image data including a first frame of image data and a second frame of image data, the second frame of image data occurring after the first frame of image data;
   generating, with the processor implementing a convolutional neural network encoder in the convolutional neural network encoder/decoder, a first encoded output using the first frame of image data as input to the convolutional neural network encoder and a second encoded output using the second frame of image data as input to the convolutional neural network encoder;
   generating, with the processor, an input for a convolutional neural network decoder in the neural network encoder/decoder using an epipolar constrained layer based on a first plurality of receptive fields in the first encoded output, a second plurality of receptive fields in the second encoded output, and a plurality of epipolar lines generated through the plurality of receptive fields in the second encoded output; and
   generating, with processor implementing the neural network decoder in the convolutional neural network encoder/decoder, the probability map corresponding to the second frame of image data.

7. The method of claim 6, the generation of the input for the convolutional neural network decoder in the convolutional neural network encoder/decoder further comprising:
   generating, with the processor, the input for the convolutional neural network decoder in the neural network encoder/decoder from the epipolar constrained layer with the epipolar line in a two-dimensional matrix of coordinates u,v as: $au+bv+c=0$ where each element $EC^{i,j}$ at coordinates i, j of the epipolar constrained layer is:
   $EC^{i,j} = \{R_t^{i,j} \cdot R_{t+1}^{u,v} | au+bv+c=0\}$ where $R_t^{i,j}$ is a one dimensional vector of one receptive field in the first plurality of receptive fields in the first encoded output and $R_{t+1}^{u,v}$ is the two-dimensional matrix u, v of a plurality of receptive fields corresponding to one epipolar line in the plurality of epipolar lines in the second encoded output, and a, b, and c represent coefficients of the one epipolar line; and generating, with the processor, the input for the convolutional neural network encoder in the neural network encoder/decoder as a block $H_{rf} \times W_{rf} \times \max(W_{rf}, H_{rf})$ of the elements $EC^{i,j}$ where $H_{rf}$ is a height of an encoded feature and $W_{rf}$ is the width of the encoded feature.

8. The method of claim 6 further comprising:
identifying, with the processor, each epipolar line in the plurality of epipolar lines based on inertial sensor data received from the inertial sensor system indicating motion of the AR system during a time between the generation of the first frame of image data and the generation of the second frame of image data.

9. The method of claim 1, the generating of the estimate of secondary motion for the AR system further comprising:
generating, with the processor, an estimate of a pose of the AR system and an orientation of the AR system with reference to the local coordinate frame.

10. An augmented reality (AR) system comprising:
an inertial sensor system;
a camera system;
a display device; and
a processor operatively connected to the inertial sensor system, the camera system, and the display device, the processor being configured to:
receive inertial sensor data generated by the inertial sensor system during movement of the AR system;
receive a plurality of frames of image data generated by the camera system during the movement of the AR system;
generate a probability map based on the inertial sensor data and the plurality of frames of image data using a convolutional neural network encoder/decoder, the probability map corresponding to one frame in the plurality of frames of image data and including a plurality of probability values corresponding to a plurality of pixels in the one frame, each probability value in the plurality of probability values indicating a probability that the corresponding pixel is in an inertial coordinate frame or a local coordinate frame;
identify visual observations of at least one landmark in the local coordinate frame based on the plurality of frames of image data and the probability map; and
generate an estimate of secondary motion for the AR system with reference to the local coordinate frame based on a first prior state in a hidden Markov model (HMM) corresponding to the local coordinate frame and the visual observations of the at least one landmark in the local coordinate frame.

11. The system of claim 10, the processor being further configured to:
generate a graphical element with the display device, the graphical element being aligned to the local coordinate frame based on the estimate of secondary motion for the AR system.

12. The system of claim 10, the processor being further configured to:
identify visual observations of at least one landmark in the inertial coordinate frame based on the plurality of frames of image data and the probability map, the at least one landmark in the inertial coordinate frame being different than the at least one landmark in the local coordinate frame; and
generating, with the processor, an estimate of primary motion for the AR system with reference to the inertial coordinate frame based on a second prior state in the HMM corresponding to the inertial coordinate frame, the inertial sensor data, and the visual observations of the at least one landmark in the inertial coordinate frame.

13. The system of claim 12, the processor being further configured to:
generate a graphical element with the display device, the graphical element being aligned to the inertial coordinate frame based on the estimate of primary motion for the AR system.

14. The system of claim 12, the processor being further configured to:
generate a first graphical element with the display device, the first graphical element being aligned to the local coordinate frame based on the estimate of secondary motion for the AR system; and
generate a second graphical element with the display device, the second graphical element being aligned to the inertial coordinate frame based on the estimate of primary motion for the AR system.

15. The system of claim 10, the processor being further configured to:
receive the plurality of frames of image data with the camera system, the plurality of frames of image data including a first frame of image data and a second frame of image data, the second frame of image data occurring after the first frame of image data;
generate a first encoded output using the first frame of image data as input to a convolutional neural network encoder in the convolutional neural network encoder/decoder and a second encoded output using the second frame of image data as input to the convolutional neural network encoder;
generate an input for a convolutional neural network decoder in the neural network encoder/decoder using an epipolar constrained layer based on a first plurality of receptive fields in the first encoded output, a second plurality of receptive fields in the second encoded output, and a plurality of epipolar lines generated through the plurality of receptive fields in the second encoded output; and
generate the probability map corresponding to the second frame of image data using the neural network decoder in the convolutional neural network encoder/decoder.

16. The system of claim 15, the processor being further configured to:
generate the input for the convolutional neural network decoder in the neural network encoder/decoder from the epipolar constrained layer with the epipolar line in a two-dimensional matrix of coordinates u,v as: $au+bv+c=0$ where each element $EC^{i,j}$ at coordinates i, j of the epipolar constrained layer is:
$EC^{i,j} = \{R_t^{i,j} \cdot R_{t+1}^{u,v} | au+bv+c=0\}$ where $R_t^{i,j}$ is a one dimensional vector of one receptive field in the first plurality of receptive fields in the first encoded output and $R_{t+1}^{u,v}$ is the two-dimensional matrix u, v of a plurality of receptive fields corresponding to one epipolar line in the plurality of epipolar lines in the second encoded output, and a, b, and c represent coefficients of the one epipolar line; and
generate the input for the convolutional neural network encoder in the neural network encoder/decoder as a block $H_{rf} \times W_{rf} \times \max(W_{rf}, H_{rf})$ of the elements $EC^{i,j}$ where $H_{rf}$ is a height of an encoded feature and $W_{rf}$ is the width of the encoded feature.

17. The system of claim 15, the processor being further configured to:
- identify each epipolar line in the plurality of epipolar lines based on inertial sensor data received from the inertial sensor system indicating motion of the AR system during a time between the generation of the first frame of image data and the generation of the second frame of image data.

18. The system of claim 10, the processor being further configured to:
- generating, with the processor, the estimate of secondary motion for the AR system include an estimate of a pose of the AR system and an orientation of the AR system with reference to the local coordinate frame.

* * * * *